US 11,248,504 B2

(12) United States Patent
Kishikawa et al.

(10) Patent No.: US 11,248,504 B2
(45) Date of Patent: Feb. 15, 2022

(54) EXHAUST DEVICE FOR INTERNAL COMBUSTION ENGINE

(71) Applicant: HONDA MOTOR CO., LTD., Tokyo (JP)

(72) Inventors: Keisuke Kishikawa, Wako (JP); Yoji Fukui, Wako (JP); Kazuya Yoshio, Wako (JP); Takuya Otsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 669 days.

(21) Appl. No.: 16/085,280

(22) PCT Filed: Jan. 13, 2017

(86) PCT No.: PCT/JP2017/001130
§ 371 (c)(1),
(2) Date: Sep. 14, 2018

(87) PCT Pub. No.: WO2017/159021
PCT Pub. Date: Sep. 21, 2017

(65) Prior Publication Data
US 2019/0085744 A1 Mar. 21, 2019

(30) Foreign Application Priority Data
Mar. 17, 2016 (JP) .............................. JP2016-054542

(51) Int. Cl.
*F01N 1/08* (2006.01)
*F01N 1/16* (2006.01)
(Continued)

(52) U.S. Cl.
CPC ............. *F01N 1/006* (2013.01); *F01N 1/026* (2013.01); *F01N 1/06* (2013.01); *F01N 1/08* (2013.01);
(Continued)

(58) Field of Classification Search
CPC ........... F01N 1/089; F01N 1/06; F01N 1/163; F01N 1/165; F01N 1/166; F01N 13/02;
(Continued)

(56) References Cited

U.S. PATENT DOCUMENTS

| 5,718,045 A | 2/1998 | Tsukahara et al. |
| 7,779,963 B2 * | 8/2010 | Muto ...................... F01N 1/003 181/252 |

(Continued)

FOREIGN PATENT DOCUMENTS

| DE | 3712495 A1 | 10/1987 |
| DE | 19514829 A1 | 10/1995 |

(Continued)

OTHER PUBLICATIONS

Extended European Search Report, dated Mar. 13, 2019, for European Application No. 17766029.7.
(Continued)

Primary Examiner — Jeremy A Luks
(74) Attorney, Agent, or Firm — Birch, Stewart, Kolasch & Birch, LLP

(57) ABSTRACT

An exhaust muffler includes a first muffler section having a tubular member made up of an inner pipe to which an exhaust pipe is connected and an outer pipe covering the inner pipe, and a connector connecting the tubular member and a second muffler section to each other, and the second muffler section having an outer shell, a first partition wall, a second partition wall, and a third partition wall. Exhaust gases delivered from the exhaust pipe are discharged from the first muffler section and the second muffler section out of the exhaust muffler. The second muffler section has a cross-sectional area larger than a cross-sectional area of the tubular member. The exhaust muffler includes a first expansion chamber, a second expansion chamber, and a third expan-
(Continued)

sion chamber. The second muffler section includes a fluid communication pipe extending through the first partition wall and the second partition wall for leading exhaust gases from the first expansion chamber into the second expansion chamber, and an exhaust passage pipe held in fluid communication with the third expansion chamber and extending through the second partition and the third partition wall. The second partition wall has a fluid communication hole defined therein that provides fluid communication between the second expansion chamber and the third expansion chamber. There is thus provided an engine exhaust device capable of increasing a silencing capability by increasing the length of a route through which the exhaust gases flow while maintaining the length of the exhaust device.

14 Claims, 19 Drawing Sheets

(51) Int. Cl.
*F01N 13/02* (2010.01)
*F01N 1/06* (2006.01)
*F01N 1/00* (2006.01)
*F01N 1/18* (2006.01)
*F01N 13/00* (2010.01)
*F01N 13/14* (2010.01)
*F01N 1/02* (2006.01)
*F01N 3/28* (2006.01)
*F01N 13/08* (2010.01)
*B62K 11/04* (2006.01)

(52) U.S. Cl.
CPC ............ *F01N 1/089* (2013.01); *F01N 1/163* (2013.01); *F01N 1/165* (2013.01); *F01N 1/166* (2013.01); *F01N 1/18* (2013.01); *F01N 3/2882* (2013.01); *F01N 13/007* (2013.01); *F01N 13/02* (2013.01); *F01N 13/082* (2013.01); *F01N 13/141* (2013.01); *B62K 11/04* (2013.01); *F01N 2230/04* (2013.01); *F01N 2240/20* (2013.01); *F01N 2240/36* (2013.01); *F01N 2340/02* (2013.01); *F01N 2340/04* (2013.01); *F01N 2470/02* (2013.01); *F01N 2470/08* (2013.01); *F01N 2470/10* (2013.01); *F01N 2470/20* (2013.01); *F01N 2470/24* (2013.01); *F01N 2490/04* (2013.01); *F01N 2490/08* (2013.01); *F01N 2490/155* (2013.01); *F01N 2490/18* (2013.01); *F01N 2590/04* (2013.01)

(58) Field of Classification Search
CPC ............ F01N 2490/02; F01N 2490/04; F01N 2490/155
See application file for complete search history.

(56) References Cited

U.S. PATENT DOCUMENTS

| 7,895,832 | B2* | 3/2011 | Gruber .................... F01N 1/084 60/299 |
| 8,006,488 | B2* | 8/2011 | Momosaki .............. F02B 29/06 60/324 |
| 8,851,230 | B2* | 10/2014 | Ono .......................... F01N 1/00 181/228 |
| 10,787,943 | B2* | 9/2020 | Kishikawa ................ F01N 1/18 |
| 2006/0000205 | A1 | 1/2006 | Bozmoski et al. |
| 2006/0162995 | A1 | 7/2006 | Schorn et al. |
| 2008/0116004 | A1* | 5/2008 | Muto ...................... F01N 1/003 181/228 |
| 2009/0000282 | A1 | 1/2009 | Gruber |
| 2014/0060963 | A1 | 3/2014 | Ono et al. |

FOREIGN PATENT DOCUMENTS

| DE | 102005003582 A1 | 8/2006 |
| DE | 102008030377 A1 | 1/2009 |
| JP | 1-155013 A | 6/1989 |
| JP | 2-081911 A | 3/1990 |
| JP | 7-229414 A | 8/1995 |
| JP | 2006-017124 A | 1/2006 |
| JP | 2010-31852 A | 2/2010 |
| JP | 2014-047762 A | 3/2014 |

OTHER PUBLICATIONS

International Search Report (PCT/ISA/210) issued in PCT/JP2017/001130, dated Feb. 28, 2017.

* cited by examiner

EXHAUST DEVICE FOR INTERNAL COMBUSTION ENGINE

TECHNICAL FIELD

The present invention relates to an exhaust device for an internal combustion engine, in which an exhaust valve is provided in an inner pipe, of double-walled pipes disposed in an exhaust muffler, connected to an exhaust pipe, to open and close the inner pipe to switch between flow passageways for exhaust gases such that when the exhaust valve closes the inner pipe, one of the flow passageways positioned upstream of the exhaust valve is selected for the exhaust gases to flow therethrough.

BACKGROUND ART

Heretofore, there has been an exhaust device in which a catalyst is disposed in an exhaust muffler, and double-walled pipes are provided including an inlet pipe held in fluid communication with a downstream side of the catalyst to receive incoming exhaust gases having passed through the catalyst and an outer pipe covering the outer periphery of the inlet pipe, and in which an exhaust valve disposed in the inlet pipe to open and close an exhaust passage pipe operates to switch between flow passageways for exhaust gases in the inlet pipe and a space between the inlet pipe and the outer pipe. With such an exhaust device, it is difficult to make attempts to increase the length of an exhaust passage for increasing the silencing capability of the exhaust muffler because a route through which the exhaust gases pass is provided by a straight double-walled pipe.

PRIOR ART DOCUMENT

Patent Document

Patent Document 1

JP 2006-017124 A

SUMMARY OF THE INVENTION

Underlying Problem to be Solved by the Invention

An exhaust device for an internal combustion engine according to the present invention has been devised in order to overcome the above difficulty. It is an object of the present invention to provide an exhaust device for an internal combustion engine, which is capable of increasing a silencing capability by increasing the length of a route through which the exhaust gases flow without involving an increase in the length of the exhaust device.

Means to Solve the Underlying Problem

According to the present invention, there is provided an exhaust device for an internal combustion engine, for discharging exhaust gases from an internal combustion engine supported on a vehicle body frame of a saddle-type vehicle, the exhaust device including: an exhaust pipe connected to the internal combustion engine; and an exhaust muffler connected to a downstream side of the exhaust pipe, characterized in that:

the exhaust muffler includes a first muffler section connected to the exhaust pipe and a second muffler section connected to a downstream side of the first muffler section, to cause exhaust gases delivered from the exhaust pipe to pass through the first muffler section and to be discharged from the second muffler section out of the exhaust muffler;

the first muffler section includes a tubular member made up of an inner pipe and an outer pipe covering the inner pipe, and a connector connecting an outer pipe of the tubular member and an outer shell of the second muffler section to each other;

the second muffler section includes the outer shell, a first partition wall partitioning a front portion of an inner space in the outer shell, a second partition wall partitioning a space behind the first partition wall, and a third partition wall partitioning a space behind the second partition wall;

the second muffler section has a cross-sectional area larger than a cross-sectional area of the tubular member of the first muffler section;

the exhaust muffler includes a first expansion chamber for receiving incoming exhaust gases from the exhaust pipe, the first expansion chamber being surrounded by the outer pipe, the connector, and the inner pipe of the first muffler section, and the outer shell and the first partition wall of the second muffler section, a second expansion chamber surrounded by the outer shell, the second partition wall, and the third partition wall of the second muffler section, and a third expansion chamber surrounded by the outer shell, the first partition wall, and the second partition wall of the second muffler section;

the second muffler section includes a fluid communication pipe extending through the first partition wall and the second partition wall for leading exhaust gases from the first expansion chamber into the second expansion chamber, and an exhaust passage pipe held in fluid communication with the third expansion chamber and extending through the second partition wall and the third partition wall; and the second partition wall has a fluid communication hole defined therein to provide fluid communication between the second expansion chamber and the third expansion chamber.

With the above arrangement, exhaust gases emitted from the internal combustion engine and having passed through the exhaust pipe are led from the first expansion chamber disposed in the tubular member as a multi-walled pipe through the fluid communication pipe across the third expansion chamber into the second expansion chamber, from which the exhaust gases are led through the fluid communication hole defined in the second partition wall into the third expansion chamber, and then discharged out of the exhaust muffler through the exhaust passage pipe that is held in fluid communication with the third expansion chamber. Therefore, the length of the route through which the exhaust gases flow is increased without involving an increase in the length of the exhaust device in its entirety, resulting in an increased silencing capability. Furthermore, since the exhaust gases are discharged into the second expansion chamber after having passed through the long slender fluid communication pipe, the energy of the exhaust gases is reduced efficiently.

In the above arrangement, the inner pipe may be connected to a downstream end of the exhaust pipe;

the exhaust passage pipe may extend through the first partition wall and may be connected to a downstream end of the inner pipe; the first expansion chamber may be defined between the inner pipe and the outer pipe of the first muffler section; the exhaust pipe may have a plurality of first through holes defined therein that is held in fluid communication with the first expansion chamber; and the inner pipe may house therein a valve for changing an amount of exhaust gases flowing from the exhaust pipe through the first through holes into the first expansion chamber, the valve being disposed downstream of the first through holes.

With the above arrangement, the inner pipe is connected to the downstream end of the exhaust pipe, the exhaust passage pipe is connected to the downstream end of the inner pipe, the exhaust pipe has the first through holes held in fluid communication with the first expansion chamber, and the inner pipe houses therein the valve for changing an amount of exhaust gases flowing from the exhaust pipe through the first through holes into the first expansion chamber. Therefore, exhaust gases are led from an upstream side of the tubular member as a multi-walled pipe into the first expansion chamber, so that the volume of the first expansion chamber can effectively be used. In addition, the proportion of exhaust gases discharged after having passed from the exhaust pipe through the inner pipe and the exhaust passage pipe and the proportion of exhaust gases discharged after having passed through the first expansion chamber, the second expansion chamber, and the third expansion chamber can be changed to control the output power of the engine. As exhaust gases flowing from the exhaust pipe into the exhaust muffler flow through the first through holes into the first expansion chamber, the flow of exhaust gases is constricted for an increased silencing capability.

In the above arrangement, the inner pipe may be connected to a downstream end of the exhaust pipe; the exhaust passage pipe may extend through the first partition wall and may be connected to a downstream end of the inner pipe. The first expansion chamber may be defined between the inner pipe and the outer pipe of the first muffler section, the inner pipe may have a plurality of first through holes defined therein; and the inner pipe may house therein a valve for changing an amount of exhaust gases discharged through the first through holes into the first expansion chamber, the valve being disposed downstream of the first through holes.

With the above arrangement, the inner pipe is connected to the downstream end of the exhaust pipe, the exhaust passage pipe is connected to the downstream end of the inner pipe, the inner pipe has the first through holes held in fluid communication with the first expansion chamber, and the inner pipe houses therein the valve for changing the amount of exhaust gases that flows from the exhaust pipe through the first through holes into the first expansion chamber. Therefore, exhaust gases are led from an upstream side of the tubular member as a multi-walled pipe into the first expansion chamber, so that the volume of the first expansion chamber can effectively be used. In addition, the proportion of exhaust gases discharged after having passed from the exhaust pipe through the inner pipe and the exhaust passage pipe and the proportion of exhaust gases discharged after having passed through the first expansion chamber, the second expansion chamber, and the third expansion chamber can be changed to control the output power of the engine. As exhaust gases flowing from the exhaust pipe into the exhaust muffler flow through the first through holes into the first expansion chamber, the flow of exhaust gases is constricted for an increased silencing capability.

In the above arrangement, the exhaust passage pipe and the third expansion chamber may be held in fluid communication with each other by a plurality of second through holes defined in the exhaust passage pipe, and the first through holes may have a diameter larger than a diameter of the second through holes.

With the above arrangement, the exhaust passage pipe and the third expansion chamber are held in fluid communication with each other through the second through holes defined in the exhaust passage pipe, and the diameter of the first through holes is larger than the diameter of the second through holes, so that exhaust gases are well discharged from an upstream side of the exhaust muffler.

In the above arrangement, the first through holes may have a total cross-sectional area smaller than a total cross-sectional area of the second through holes.

With the above arrangement, as the total area of the second through holes is larger than the total area of the first through holes, exhaust gases in the exhaust muffler are easily discharged through the second through holes.

In the above arrangement, the outer tube may have an inside diameter ranging from 1.5 to 2.0 times an inside diameter of the inner pipe.

With the above arrangement, while the volume of the first expansion chamber defined between the inner pipe and the outer pipe is sufficiently maintained, the diameter of the tubular member connected to the exhaust pipe is not much larger than the diameter of the exhaust pipe, but the tubular member is of a shape blending into the exhaust pipe. The tubular member is thus placed in the conventional layout of the exhaust pipe, and hence can be designed for a better layout configuration.

In the above arrangement, the fluid communication pipe may have an inside diameter equal to or smaller than one half of an inside diameter of the exhaust passage pipe.

With the above arrangement, exhaust gases are sufficiently discharged from the larger-diameter exhaust passage pipe, and exhaust gases from the first expansion chamber are discharged through the slender and long fluid communication pipe into the second expansion chamber, so that the energy of exhaust gases is reduced further efficiently for a better silencing capability.

In the above arrangement, the first expansion chamber may have a length larger than the sum of a length of the second expansion chamber and a length of the third expansion chamber in the direction of flow of exhaust gases in the exhaust pipe, the inner pipe, and the exhaust passage pipe.

With the above arrangement, as the length of the first expansion chamber defined in the tubular member which is of a smaller cross-sectional area is larger than the sum of the lengths of the second expansion chamber and the third expansion chamber that are defined in the second muffler section which is of a larger cross-sectional area, the first expansion chamber has a sufficient volume and the exhaust device has a neat appearance.

In the above arrangement, the first through holes may be positioned on an upstream end side of the first muffler section, upstream of a position at one half of the distance between an upstream end of the first muffler section and a valve shaft of the valve in the direction of flow of exhaust gases in the first muffler section.

With the above arrangement, since the first through holes are disposed closely to an upstream end of the first muffler section in the direction of the flow of exhaust gases, exhaust gases are discharged into an upstream side of the first expansion chamber, which is effectively put to use.

Advantageous Effect of Invention

According to the present invention, there is provided an exhaust device for an internal combustion engine, which includes a muffler that is compact in a longitudinal direction thereof.

DESCRIPTION OF EMBODIMENTS OF THE INVENTION

An exhaust device 20 for an internal combustion engine according to a first embodiment of the present invention for use on a saddle-type vehicle will be described below with reference to FIGS. 1 through 18.

Figure 1:
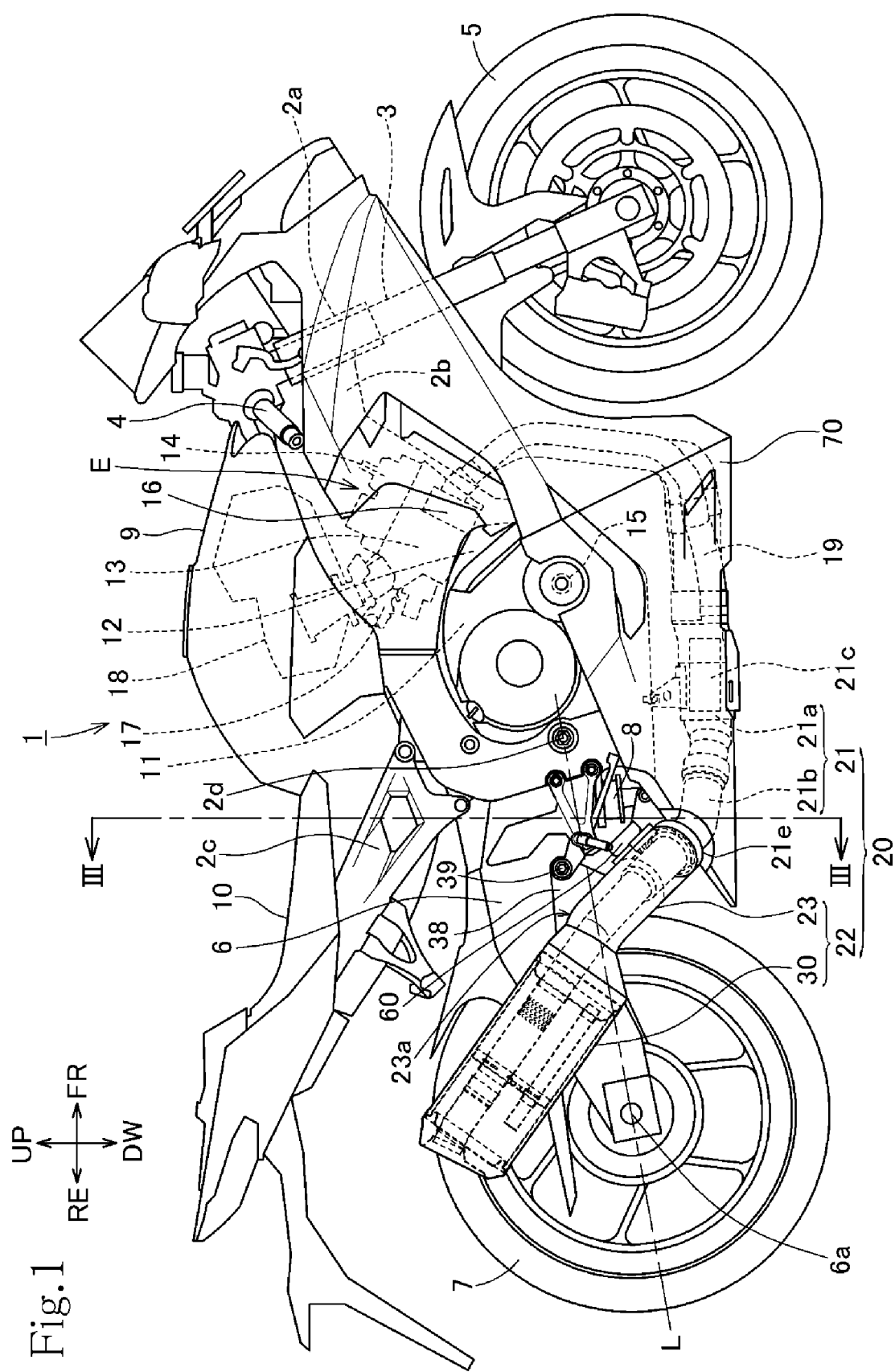
FIG. 1 is a left-hand side elevational view of a two-wheel motorcycle incorporating an exhaust device for an internal combustion engine according to a first embodiment of the present invention.

FIG. 1 is a right-hand side elevational view of a two-wheel motorcycle 1 as an example of a saddle-type vehicle incorporating the exhaust device 20 according to the present embodiment. In the present description, forward, rearward, leftward, and rightward directions are defined with respect to the posture of the motorcycle 1 that is oriented in a forward direction along which the motorcycle 1 moves ahead.

The motorcycle 1 includes a vehicle body frame 2 constructed as follows. A pair of left and right main frames 2b and 2b is fixed to a head pipe 2a and extends rearward and substantially horizontally and is bent downward in surrounding relation to an internal combustion engine E of the motorcycle 1. Seat rails 2c are mounted on upper rear portions of the main frames 2b and extend rearward while spreading to the left and right.

In the vehicle body frame 2, a front fork 3 is pivotally supported on the head pipe 2a, and a handle 4 extending to the left and right is mounted on an upper end of the front fork 3. A front wheel 5 is rotatably supported on a lower end of the front fork 3. A swing arm 6 has a front end pivotally supported by a pivot shaft 2d mounted on lower portions of the main frames 2b and extends rearward, and a rear wheel 7 is rotatably supported on a rear end of the swing arm 6 by a rear wheel drive axle 6a. A rear cushion 8 is interposed between the swing arm 6 and a lower portion of the vehicle body frame 2. A fuel tank 9 is mounted on the main frames 2b and the seat rails 2c, and a rider's seat 10 is supported on the seat rails 2c behind the fuel tank 9. A cowl 70 extending from a front upper portion of the motorcycle 1 to side lower portions thereof is attached to the vehicle body of the motorcycle 1.

The internal combustion engine E supported on the vehicle body frame 2 includes an in-line four-cylinder, four-stroke internal combustion engine, for example, and includes a cylinder block 12 and a cylinder head 13 that are stacked successively on a crankcase 11 and fastened integrally together by bolts (not depicted), with the cylinder head 13 being covered with a cylinder head cover 14 disposed on its upper portion. The internal combustion engine E has a crankshaft 15 oriented in the widthwise directions of the vehicle body, is surrounded by the vehicle body frame 2, and has cylinders 16 of the internal combustion engine E slightly inclined forward. Rotary driver power of the crankshaft 15 is transmitted through the rear wheel drive axle 6a to the rear wheel 7 by a drive belt, not shown. The pivot shaft 2d by which the swing arm 6 is pivotally supported is disposed at a higher position than the rear wheel drive axle 6a as the vehicle is viewed in side elevation of FIG. 1.

To the cylinders 16 of the internal combustion engine E, there are connected an intake manifold (not depicted) having a fuel injection valve (not depicted), a throttle body 17, a connecting tube (not depicted), and an air cleaner 18 arranged in succession. Ambient air that is drawn in from the air cleaner 18 is mixed with a fuel injected from the fuel injection valve, producing an air-fuel mixture that is delivered to the cylinders 16 of the internal combustion engine E in which the air-fuel mixture is burned.

An exhaust manifold 19 is connected to the cylinders 16 of the internal combustion engine E. The exhaust manifold 19 includes pipes connected to the respective cylinders 16, extends downward, is bent and extends rearward, and has a downstream end connected to an exhaust pipe 21. The exhaust pipe 21 has a downstream end 21e connected to an exhaust muffler 22. The exhaust pipe 21 and the exhaust muffler 22 jointly make up the exhaust device 20. The exhaust muffler 22 includes a first muffler section 23 connected to the exhaust pipe 21 and a second muffler section 30 connected to a rear portion of the first muffler section 23. Exhaust gases discharged from the cylinders 16 of the internal combustion engine E are delivered from the exhaust manifold 19 to the exhaust device 20, from which the exhaust gases are discharged into the ambient air. The exhaust device 20 includes an exhaust device mount member 38 by which the exhaust device 20 is mounted on the vehicle body frame 2 in a manner to extend obliquely rearward and upward at a position on the right-hand side of the motorcycle 1.

Figure 4:
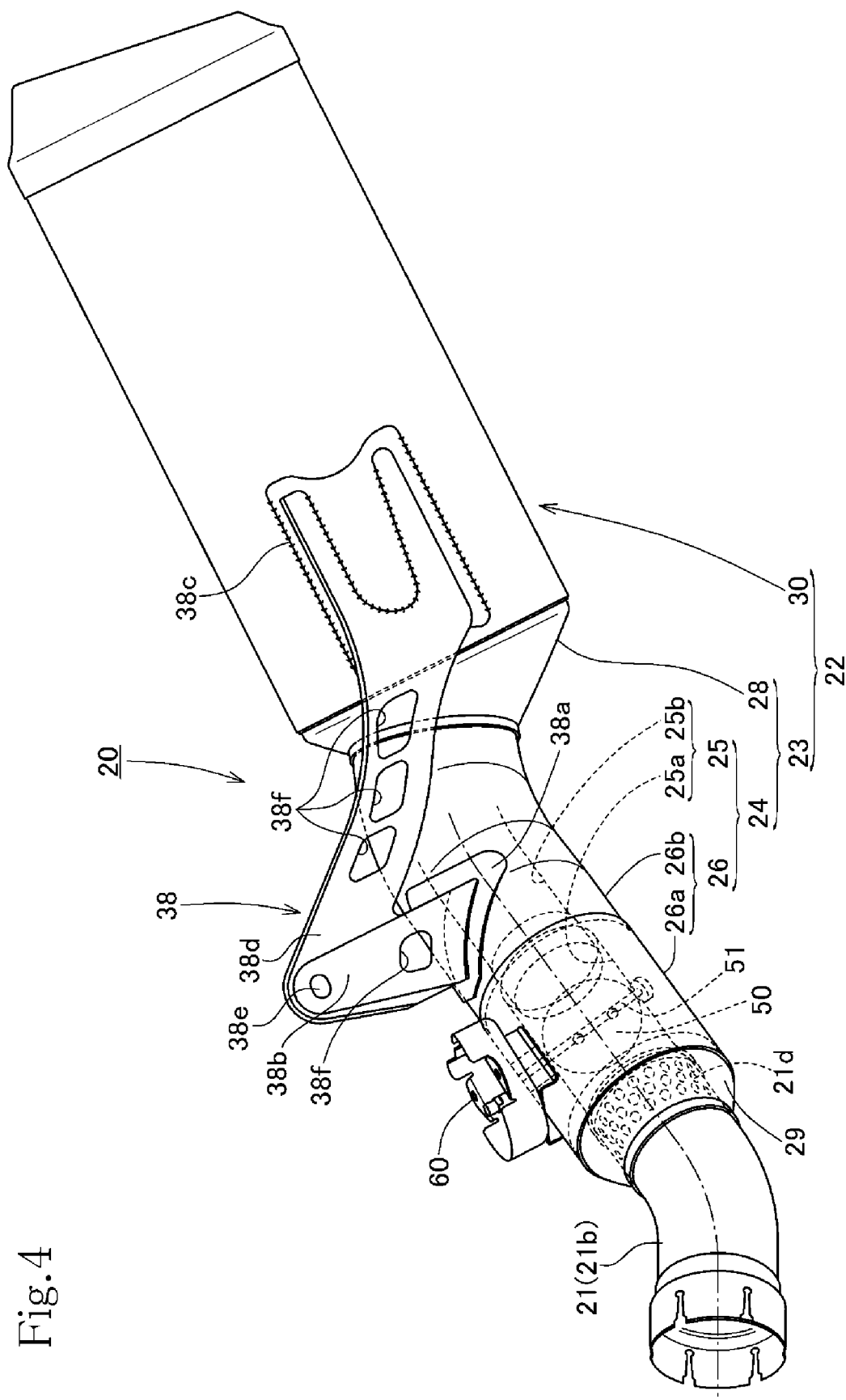
FIG. 4 is a perspective view of the exhaust device.

As shown in FIG. 4, the exhaust device mount member 38 includes a front mount 38a and a rear mount 38c that are fixed respectively to the first muffler section 23 and the second muffler section 30, a front mount piece 38b extending from the front mount 38a upward of the first muffler section 23, and a rear mount piece 38d extending from the rear mount 38c and joining the rear mount 38c to an upper end of the front mount piece 38b. A mount boss 38e as a vehicle mount to be mounted on the motorcycle 1 is provided on the junction between the front mount piece 38b and the rear mount piece 38d. The exhaust device mount member 38 also has through holes 38f, one in the front mount piece 38b and three in the rear mount piece 38d, for making itself lightweight. As depicted in FIG. 1, a mounting bolt 39 is inserted through the mount boss 38e of the exhaust device mount member 38 and fastened to the motorcycle 1, thereby mounting the exhaust device 20 to the motorcycle 1.

Figure 5:
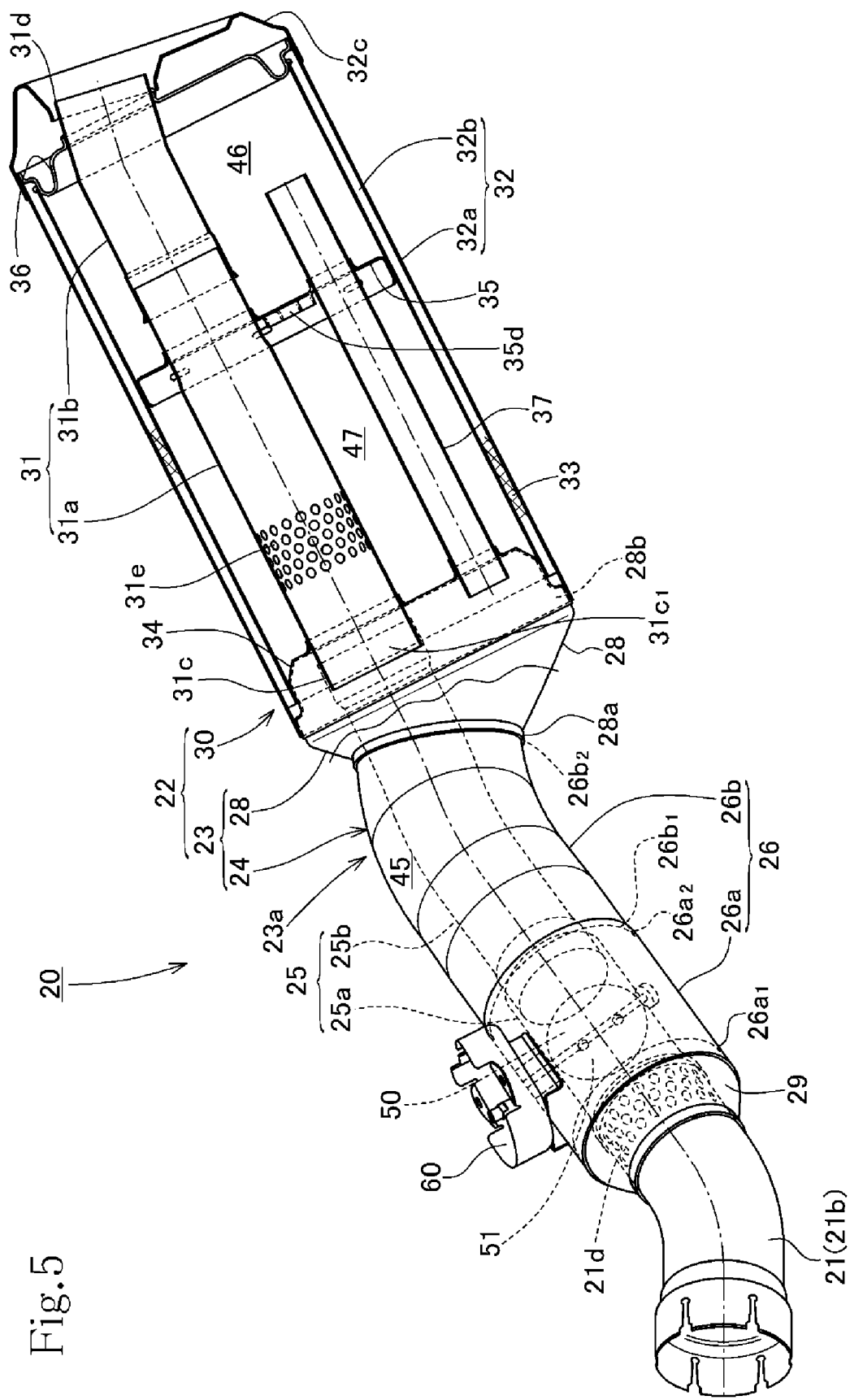
FIG. 5 is a perspective view, partly cut away, of the exhaust device with an exhaust device mount member detached.
Figure 7:
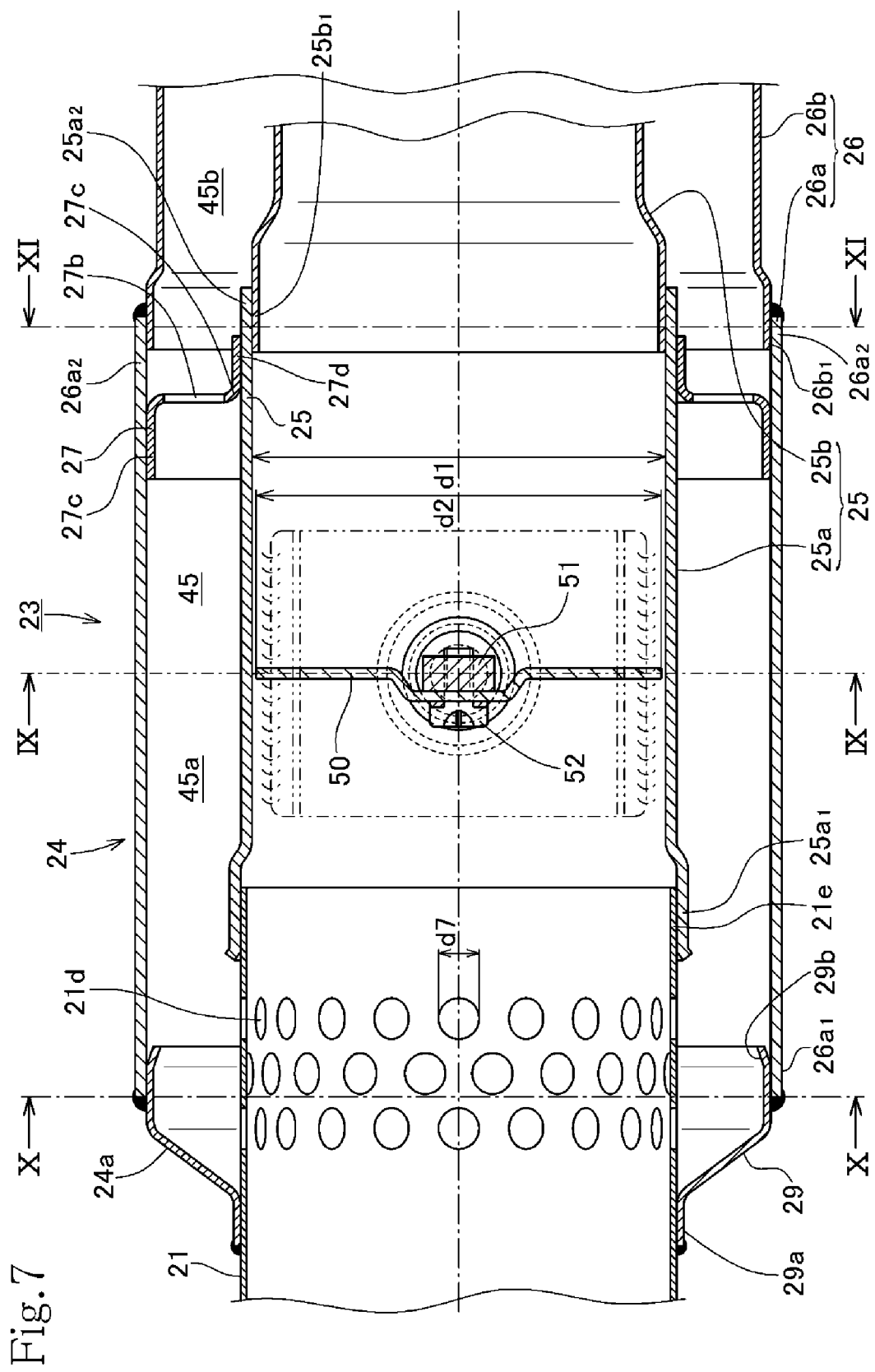
FIG. 7 is a fragmentary horizontal sectional view of a first muffler section.
Figure 8:
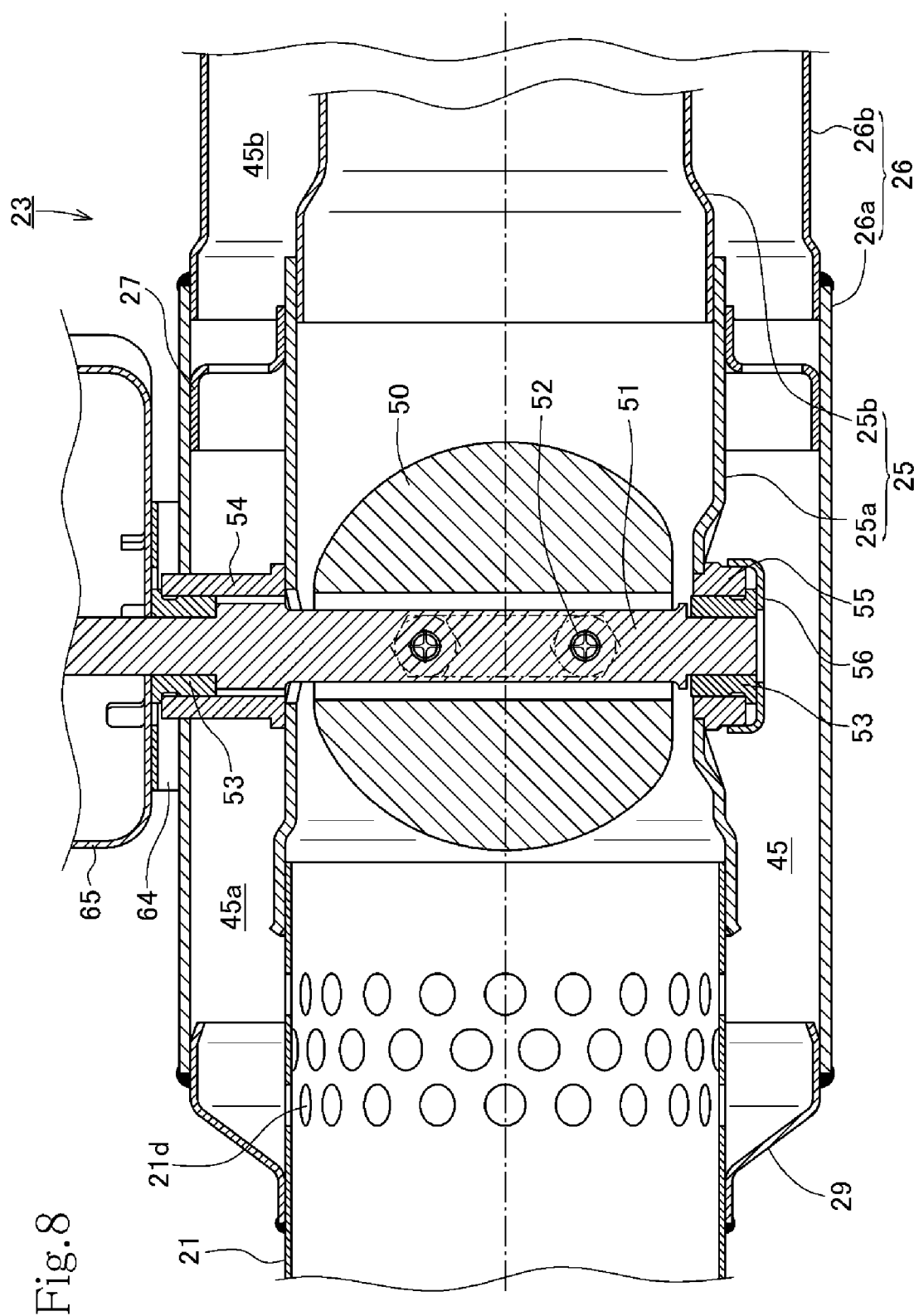
FIG. 8 is a fragmentary vertical sectional view of the first muffler section.

As depicted in FIGS. 1 and 4, the exhaust device 20 includes the exhaust pipe 21 connected to a rear end of the exhaust manifold 19 for receiving burned exhaust gases from the internal combustion engine E, and the exhaust muffler 22 for silencing exhaust gases delivered from the exhaust pipe 21. As depicted in FIGS. 4, 5, and 7, the exhaust muffler 22 has an upstream end connected to a downstream end of the exhaust pipe 21. As depicted in FIG. 1, the exhaust muffler 22 is in an attitude extending obliquely rearward and upward with respect to the motorcycle 1 on which the exhaust muffler 22 is mounted.

Figure 2:
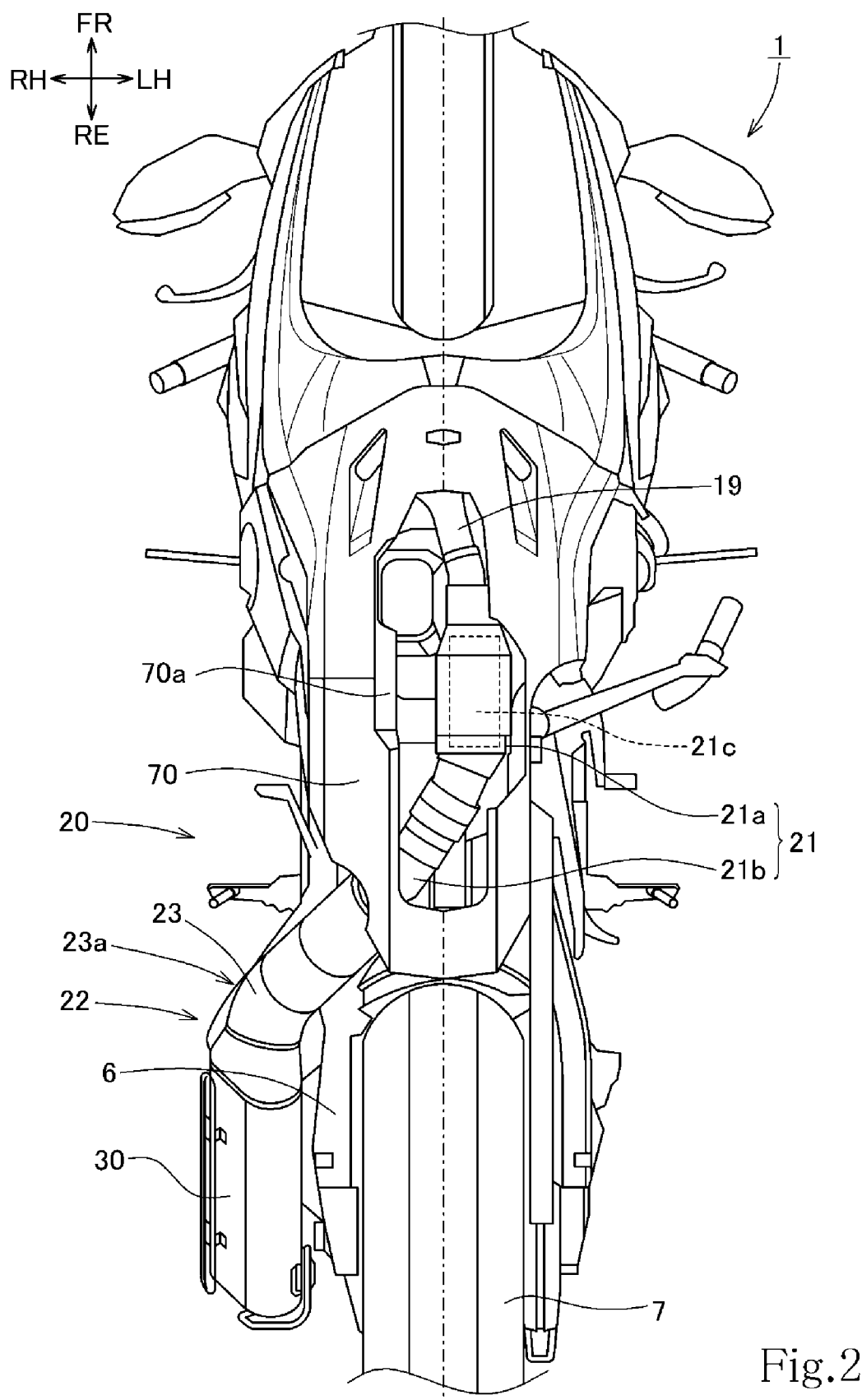
FIG. 2 is a bottom view of the motorcycle depicted in FIG. 1.

As depicted in FIG. 1, the exhaust pipe 21 connected to the first muffler section 23 is positioned below the internal combustion engine E and includes an upstream exhaust pipe 21a and a downstream exhaust pipe 21b. The upstream exhaust pipe 21a houses therein a catalytic device 21c for purifying exhaust gases. As depicted in FIG. 2, which is a bottom view of the vehicle, the exhaust pipe 21 is inclined from the left side in the widthwise directions of the vehicle across the center of the vehicle toward the right side of the vehicle where the first muffler section 23 is disposed, and the catalytic device 21c is offset to the left side in a widthwise direction. The catalytic device 21c has its upper and left sides surrounded by the internal combustion engine E. The cowl 70 has an opening 70a defined in a lower portion thereof, and the catalytic device 21c is positioned in the opening 70a as seen from the bottom view of the vehicle.

As depicted in FIG. 5, the exhaust muffler 22 has its interior divided, by a first partition wall 34 and a second partition wall 35, into a first expansion chamber 45, a third expansion chamber 47, and a second expansion chamber 46 that are arranged successively from the front. To the downstream end 21e of the exhaust pipe 21, there are successively connected an inner pipe 25 of the first muffler section 23, to be described below, through which exhaust gases from the exhaust pipe 21 flow, and an exhaust passage pipe 31 of the second muffler section 30. The inner pipe 25 and the exhaust passage pipe 31 are of a hollow cylindrical shape extending through the expansion chambers 45, 46, and 47 in the exhaust muffler 22 to a rear end of the exhaust device 20, and has a diameter that remains essentially the same from the front end of the inner pipe 25 to the rear end of the exhaust passage pipe 31. The exhaust muffler 22 is thus made up of a plurality of layers including the inner pipe 25, the exhaust passage pipe 31, and the expansion chambers 45, 46, and 47 provided around the outer periphery of the exhaust passage pipe 31. Furthermore, an exhaust valve 50 for switching between flow passageways for exhaust gases by opening and closing the inner pipe 25 is disposed in the inner pipe 50.

As depicted in FIGS. 5 and 7, the first muffler section 23 includes a double-walled tubular member 24 connected to the exhaust pipe 21, a connector 28 connecting the tubular member 24 and the second muffler section 30 to each other, a front cover 29 that closes a front end of the first muffler section 23, an annular plate member 27 disposed in the tubular member 24, and the exhaust valve 50.

Figure 17:
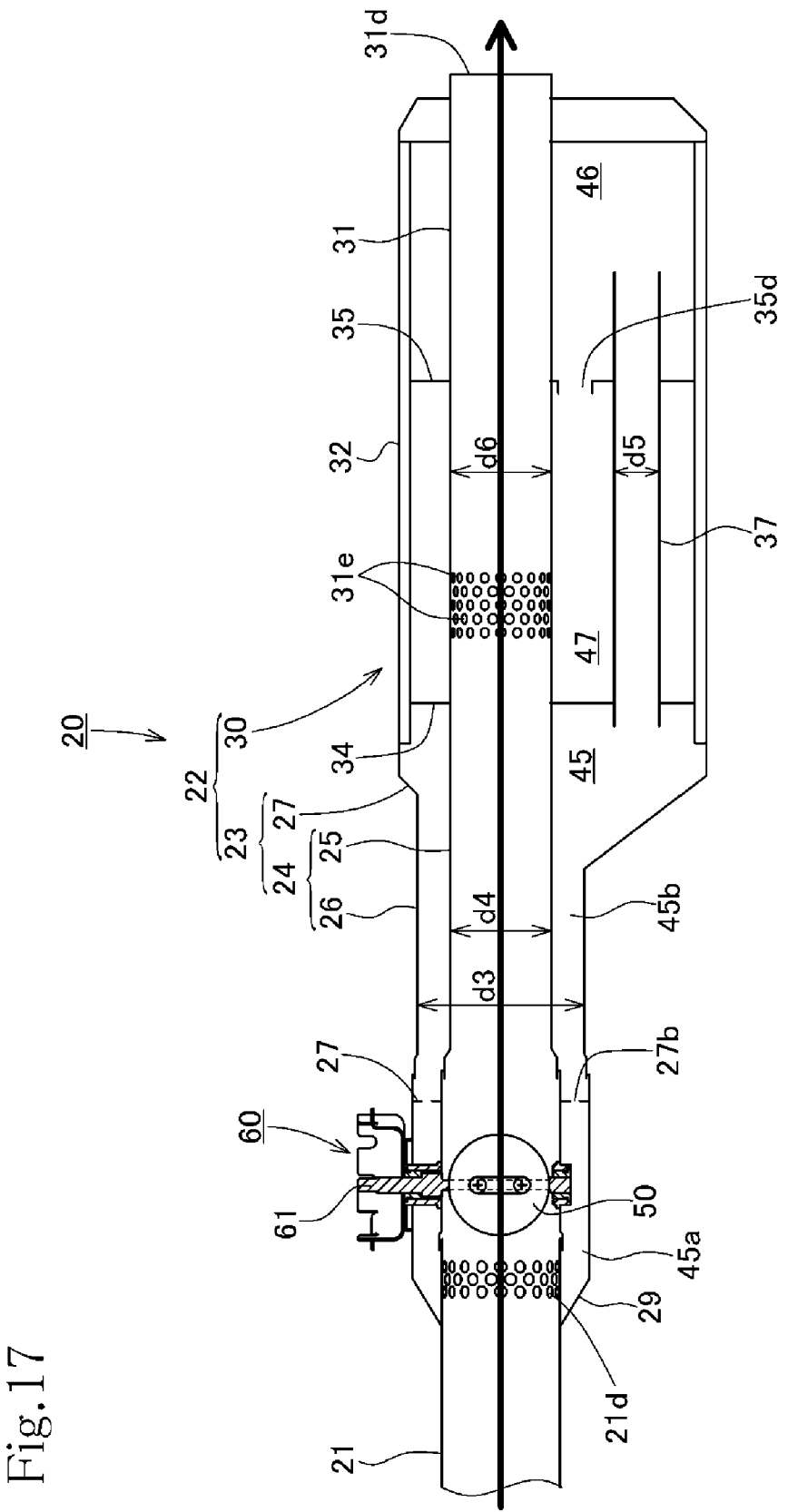
FIG. 17 is a schematic view of an exhaust muffler device, depicting a flow of exhaust gases while the exhaust valve is open.

The tubular member 24 includes the inner pipe 25 connected to the exhaust pipe 21 and an outer pipe 26 covering the inner pipe 25. The inner pipe 25 and the outer pipe 26 are double-walled pipes disposed substantially concentrically with each other. As depicted in FIG. 17, the outer pipe 26 has an inside diameter d3 which is in the range from 1.5 to 2.0 times an inside diameter d4 of the inner pipe 25.

As depicted in FIGS. 5 and 7, the inner pipe 25 is made up of a plurality of divided pipes including a first divided inner pipe 25a positioned upstream and connected to the exhaust pipe 21 and a second divided inner pipe 25b connected to the downstream end $25a_2$ of the first divided inner pipe 25a. The first divided inner pipe 25a and the second divided inner pipe 25b are of substantially the same diameter. The downstream end 21e of the exhaust pipe 21 is fitted in an upstream end $25a_1$ of the first divided inner pipe 25a, and an upstream end $25b_1$ of the second divided inner pipe 25b is fitted in the downstream end $25a_2$ of the first divided inner pipe 25a. These fitted ends are not welded, but are telescopically connected to each other.

The outer pipe 26 is made up of a plurality of divided pipes including a first divided outer pipe 26a positioned upstream, a second divided outer pipe 26b connected by welding to a downstream end $26a_2$ of the first divided outer pipe 26a, and the front cover 29 covering an upstream side of the first divided outer pipe 26a. An upstream end $26b_1$ of the second divided outer pipe 26b is fitted in the downstream end $26a_2$ of the first divided outer pipe 26a. These fitted ends are fixed to each other by welding. As depicted in FIG. 5, a downstream end $26b_2$ of the second divided outer pipe 26b is connected to an upstream end 28a of the connector 28 and fixed thereto by welding.

The front cover 29 closing the gap between an upstream end $26a_1$ of the first divided outer pipe 26a and the exhaust pipe 21 has, as depicted in FIG. 7, an upstream end 29a that is of the same diameter as the outside diameter of the exhaust pipe 21, is progressively larger in diameter toward downstream side, and has a downstream end 29b that is of the same diameter as the upstream end of the first divided outer pipe 26a. The upstream end 29a of the front cover 29 is connected to the downstream end 21e of the exhaust pipe 21 and fixed thereto by welding, and the downstream end 29b of the front cover 29 is connected to the upstream end $26a_1$ of the first divided outer pipe 26a and connected thereto by welding.

As shown in FIG. 5, the first divided inner pipe 25a and the second divided outer pipe 26a are of a straight shape, and the second divided inner pipe 25b and the second divided outer pipe 26b are of a gradually curved shape. The inner pipe 25 and the outer pipe 26 are disposed substantially concentrically with each other. The first expansion chamber 45 is defined between the inner pipe 25 and the outer pipe 26 of the first muffler section 23.

Figure 11:
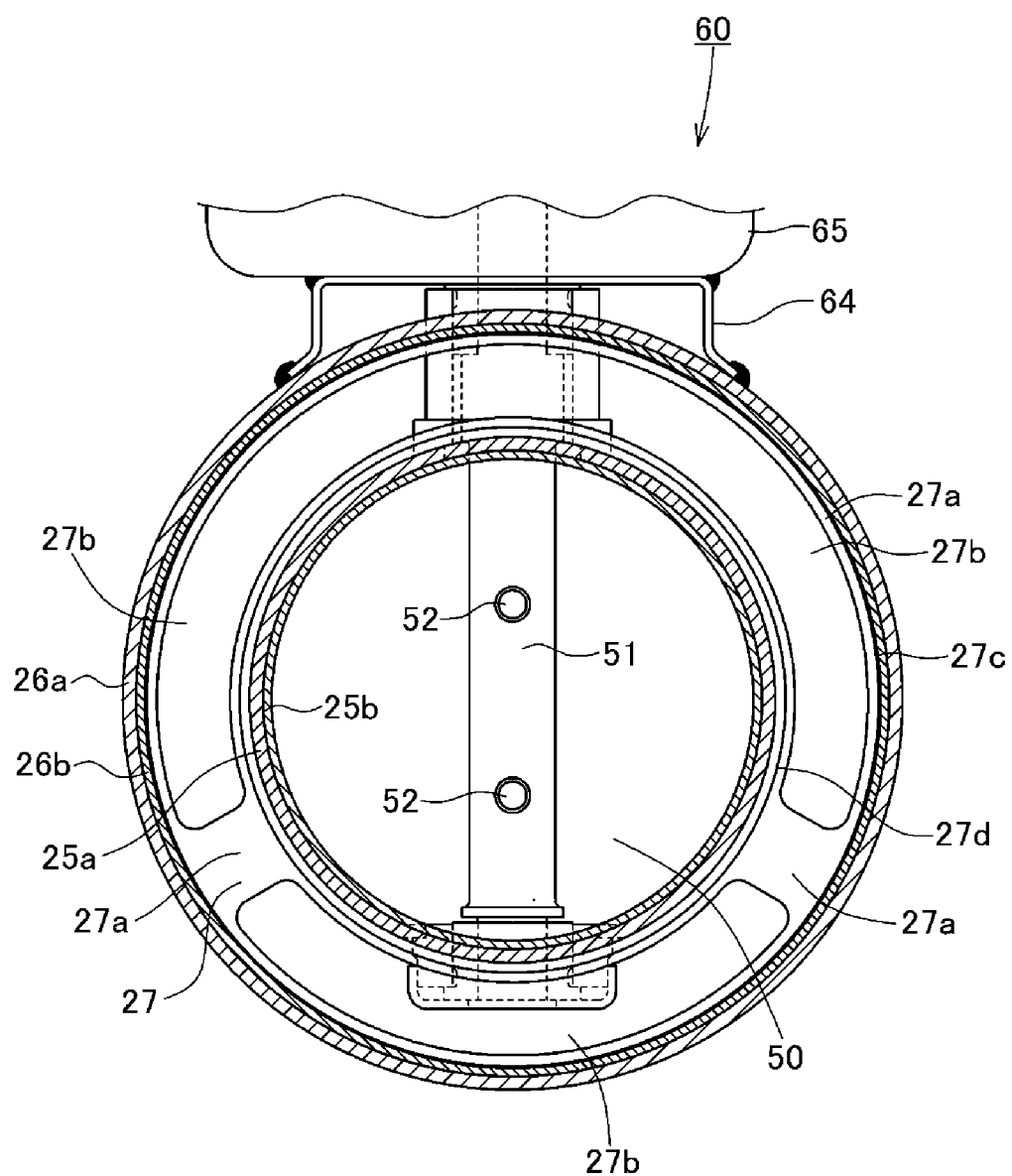
FIG. 11 is a cross-sectional view taken along line XI-XI of FIG. 7, depicting the valve actuator in the upper position.

As depicted in FIG. 7, the annular plate member 27 is fixed to an outer circumferential surface of the inner pipe 25 and an inner circumferential surface of the outer pipe 26, and divides the first expansion chamber 45 into a first compartment 45a and a second compartment 45b. As shown in FIG. 11, the annular plate member 27 includes a ring-shaped annular plate 27a having an outside diameter that is the same as the inside diameter of the first divided outer pipe 26a and an inside diameter that is the same as the outside diameter of the first divided inner pipe 25a inserted in the annular plate 27a. The annular plate 27a has a plurality of (two in the present embodiment) fluid communication holes 27b defined therein that provide fluid communication between the first compartment 45a and the second compartment 45b of the first expansion chamber 45. The fluid communication holes 27b are shaped as oblong holes along the circumferential directions of the annular plate 27a. One of the fluid communication holes 27b which is defined in an upper portion of the annular plate 27a is of a length that is approximately two thirds of the circumferential length of the annular plate 27a, whereas the other fluid communication hole 27b which is defined in a lower portion of the annular plate 27a is of a length that is approximately one third of the circumferential length of the annular plate 27a. As depicted in FIG. 7, the annular plate 27a includes a fixing flange 27c extending rearward from an outer circumferential edge of the annular plate 27a perpendicularly to the annular plate 27a and having a predetermined width, and a fixing flange 27d extending forward from an inner circumferential edge of the annular plate 27a perpendicularly to the annular plate 27a and having a predetermined width.

As depicted in FIG. 7, the fixing flange 27c of the annular plate member 27 is held in abutment against and fixed to an inner circumferential surface of a downstream portion of the first divided outer pipe 26a, and the fixing flange 27d thereof is held in abutment against and fixed to an outer circumferential surface of a downstream portion of the first divided inner pipe 25a. The annular plate member 27 is fixedly disposed in the first divided outer pipe 26a such that its plane lies perpendicularly to the longitudinal directions of the first divided outer pipe 26a. The downstream portions of the first divided outer and inner pipes 26a and 25a that are disposed as inner and outer double-walled pipes have respective inner and outer wall surfaces integrally connected to each other by the annular plate member 27 in a manner to close the gap therebetween.

Figure 9:
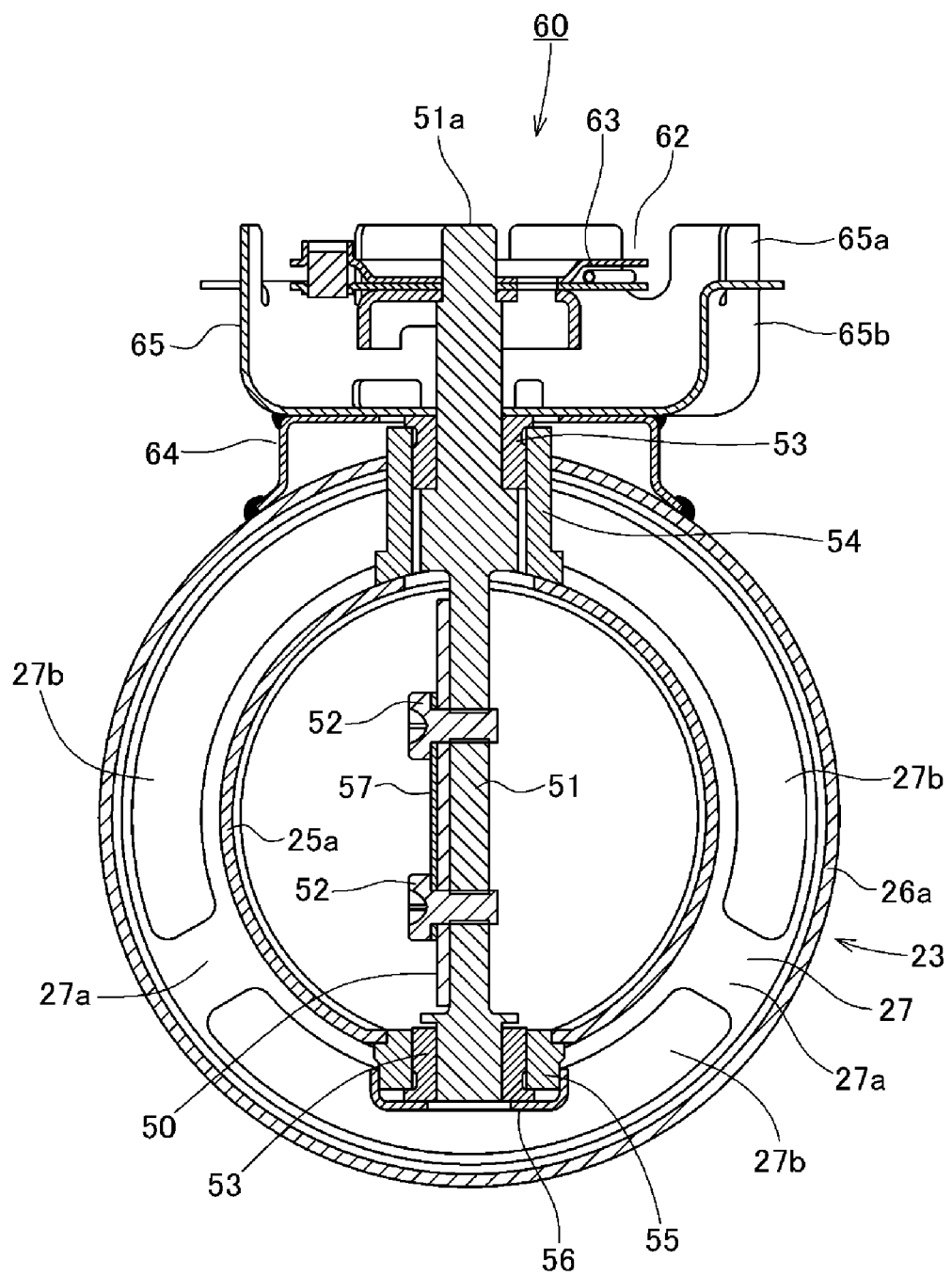
FIG. 9 is a cross-sectional view taken along line IX-IX of FIG. 7, depicting an exhaust valve in an open state with a valve actuator in an upper position.
Figure 10:
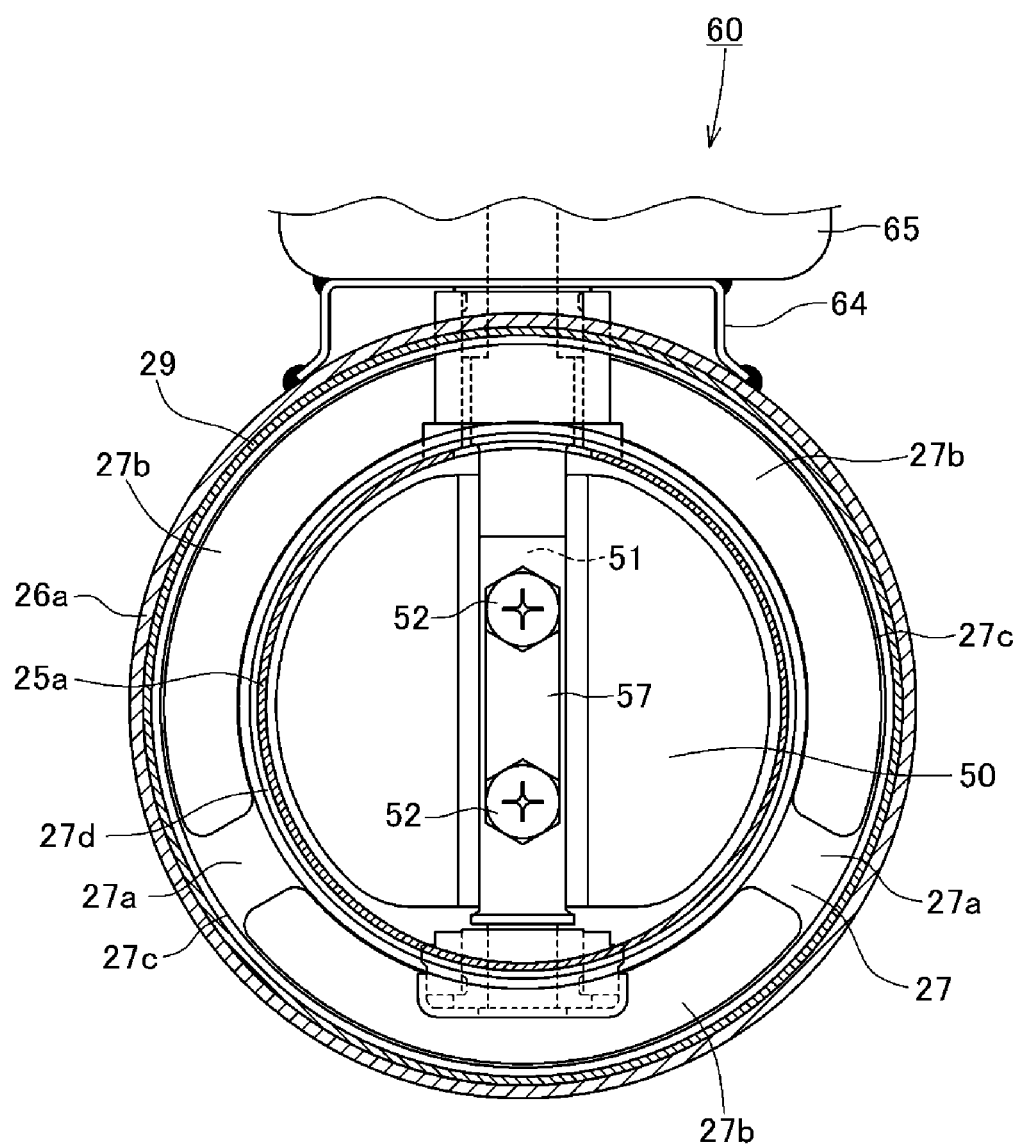
FIG. 10 is a cross-sectional view taken along line X-X of FIG. 7, depicting the valve actuator in the upper position.

As depicted in FIGS. 5, 7, and 9, the exhaust valve 50 for opening and closing the inner pipe 25 for changing an amount of exhaust gases discharged from first through holes 21d, to be described later, into the first expansion chamber 45 is provided in the first divided inner pipe 25a of the inner pipe 25 that is positioned upstream. The exhaust valve 50 is controlled for its opening and closing operation depending on the output power of the internal combustion engine E. The exhaust valve 50 serves as a device for silencing exhaust gases by changing flow passageways for the exhaust gases to expand the exhaust gases, and also for adjusting the characteristics of the internal combustion engine E by applying a back pressure to the exhaust gases. As depicted in FIG. 7, the exhaust valve 50 is disposed in a region of the exhaust muffler 22 where the first divided inner pipe 25a and the first divided outer pipe 26a are provided as the inner and outer double-walled pipes, and is positioned upstream of the annular plate member 27 with respect to the direction along which the exhaust gases flow. As depicted in FIG. 5, the exhaust valve 50 is of a disk shape whose outer edge extends along an inner circumferential surface of the first divided inner pipe 25a. As shown in FIG. 7, the exhaust valve 50 has an outside diameter d2 smaller than an inside diameter d1 of the first divided inner pipe 25a, allowing a very small amount of exhaust gases upstream of the exhaust valve 50 to pass through the gap between the exhaust valve 50 and the first divided inner pipe 25a to a downstream side of the exhaust valve 50 even when the exhaust valve 50 is closed.

As depicted in FIGS. 9 through 12, the exhaust valve 50 includes an exhaust valve shaft 51 fastened thereto by a pair of screws 52 with a washer 57 interposed therebetween. The exhaust valve shaft 51 is coupled to a valve actuator 60 that opens and closes the exhaust valve 50. As depicted in FIG. 5, the exhaust valve shaft 51 extends through an outer surface of the first divided outer pipe 26a of the first muffler section 23 of the exhaust muffler 22, and the valve actuator 60 is disposed on an outer side surface of the exhaust muffler 22. As FIG. 9 shows, the exhaust valve shaft 51 is angularly movably supported by bearings 53 on an upper support member 54 mounted on an upper portion of the first divided inner pipe 25a and a lower support member 55 mounted on a lower portion of the first divided inner pipe 25a. A cap 56 for preventing the exhaust valve shaft 51 from coming off is attached to a lower surface of the lower support member 55.

Figure 12:
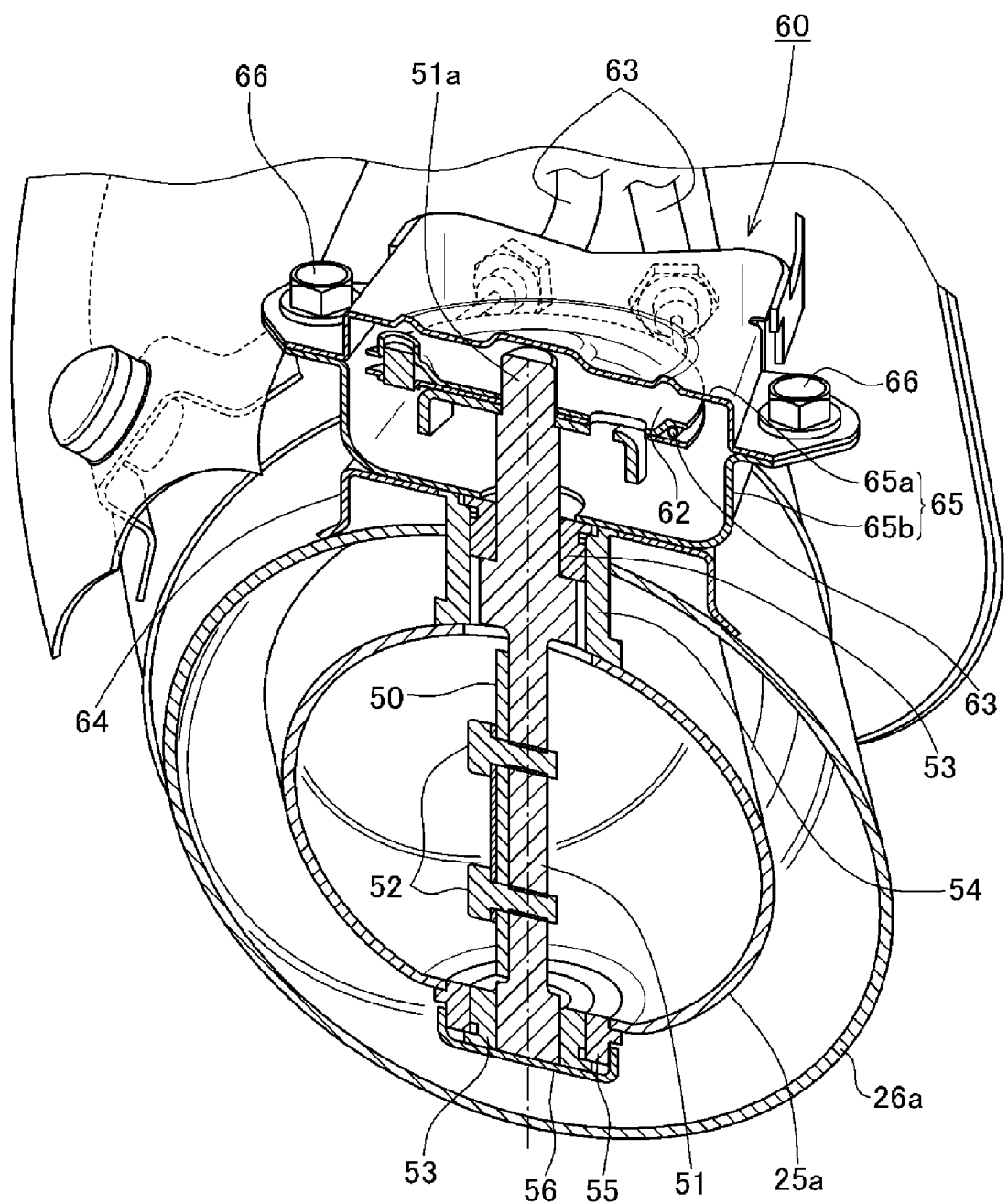
FIG. 12 is a perspective view of the first muffler section partly cut away along a plane lying along the axis about which the exhaust valve is actuated.

As depicted in FIGS. 9 and 12, the exhaust valve shaft 51 has an upper portion 61a extending upward through upper portions of the first divided inner pipe 25a and the first divided outer pipe 26a. A pulley 62 is mounted on the upper portion 51a of the exhaust valve shaft 51 for angular movement in unison therewith, and a drive wire 63 is trained around the pulley 62. When the drive wire 63 is pulled by a drive device, not depicted, the exhaust valve shaft 51 is angularly moved about its own axis, opening and closing the exhaust valve 50 in the first divided inner pipe 25a. The pulley 62 has its peripheral area covered with a case 65 that is made up of an upper case body 65a and a lower case body 65b which are integrally fastened to each other by a pair of bolts 66. The case 65 is supported on a base 64 welded to an outer surface of the first divided outer pipe 26a.

Figure 3:
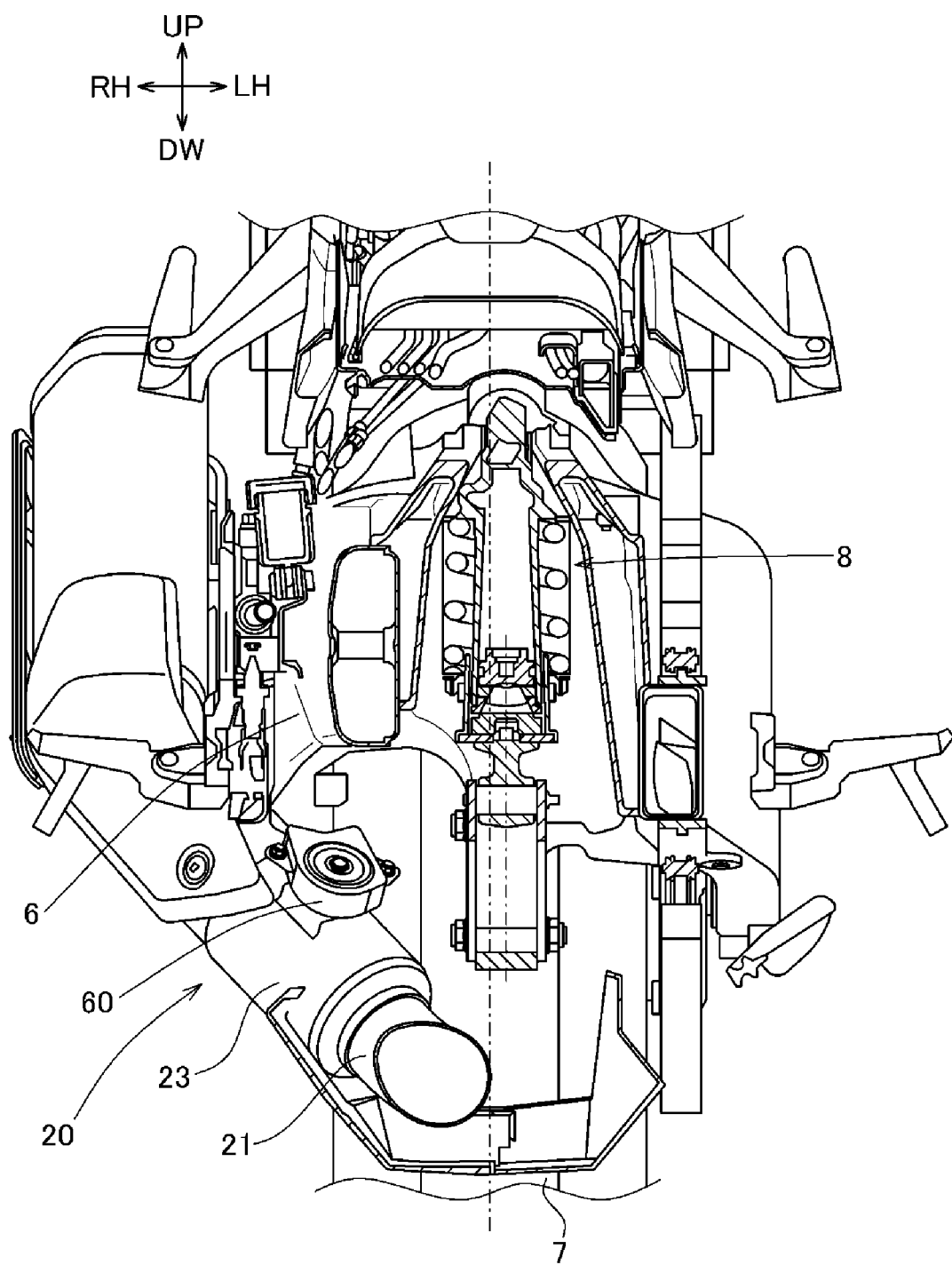
FIG. 3 is a cross-sectional view taken along line III-III in FIG. 1.

As depicted in FIG. 1, the valve actuator 60 for actuating the exhaust valve 50 is disposed behind the vehicle body frame 2. As depicted in FIG. 3, the valve actuator 60 is disposed below the swing arm 6 and above the first muffler section 23 in the widthwise directions of the vehicle. As the valve actuator 60 is surrounded by the vehicle body frame 2 and the swing arm 6, it is protected without a dedicated cover provided therefor.

As shown in FIG. 7, the exhaust pipe 21 has the plurality of first through holes 21d defined therein between an area where the front cover 29 is welded to the exhaust pipe 21 and an area where the exhaust pipe 21 is connected to the first divided inner pipe 25a. The through holes 21d provide fluid communication between the inside of the first divided inner pipe 25a and the first expansion chamber 45. The first through holes 21d have a diameter d7 of 6 mm each, for example, and are arranged in three rows along the longitudinal directions of the exhaust pipe 21, each row including 20 first through holes 21d arranged in the circumferential directions of the exhaust pipe 21. When the exhaust valve 50 closes the inner pipe 25, exhaust gases flowing from the exhaust pipe 21 into the inner pipe 25 pass through the first through holes 21d and flow into the first compartment 45a of the first expansion chamber 45.

The first through holes 21d are positioned upstream of an area at one half of the distance between the upstream end of the first muffler section 23 and the exhaust valve shaft 51 of the valve 50 in the direction of a flow of exhaust gases in the first muffler section 23.

As depicted in FIG. 5, the first muffler section 23 includes the tubular member 24 made up of the inner pipe 25 and the outer pipe 26 and the connector 28 that connects the second muffler section 30, to be described later, to the tubular member 24. The connector 28 interconnects the outer pipe 26 and a second muffler body 32 that serves as an outer shell of a second muffler section 30 to be described later. The upstream end 28a of the connector 28 is of substantially the same diameter as the diameter of the downstream end 28b2 of the second divided outer pipe 26b. The connector 28 is progressively larger in diameter toward downstream side, and has a downstream end 28b that is of substantially the same diameter as the outside diameter of the second muffler section 30. The connector 28 and the second muffler section 30 are connected and fixed to each other.

As depicted in FIG. 1, the first muffler section 23 of the exhaust muffler 22 is curved vertically as depicted in side elevation. As depicted in FIG. 3, the first muffler section 23 has at least a portion disposed below the swing arm 6 in the widthwise directions of the vehicle, and extends outward from the position below the swing arm 6. As depicted in plan in FIG. 6, the tubular member 24 of the first muffler section 23 has a curved portion 23a between the area where the exhaust valve 50 is disposed and the connector 28. As depicted in FIG. 2, the curved portion 23a of the tubular member 24 is curved in the transverse directions of the vehicle outwardly of the swing arm 6 such that the second muffler section 30 in a rear portion of the exhaust muffler 22 lies along the longitudinal directions of the vehicle.

As FIG. 5 shows, the second muffler section 30 is connected to a rear portion of the first muffler section 23. The second muffler section 30 includes a second muffler body 32 serving as an outer shell of the second muffler section 30, the first partition wall 34 and the second partition wall 35 that divide the interior of the second muffler body 32, a rear wall 36 as a third partition wall that closes a downstream end of the second muffler body 32, the exhaust passage pipe 31 connected to a downstream end of the inner pipe 25 of the first muffler section 23, extending through the first partition wall 34, the second partition wall 35, and the rear wall 36, and held in fluid communication with the ambient air, and a fluid communication pipe 37 extending through the first partition wall 34 and the second partition wall 35 and providing fluid communication between the first expansion chamber 45 and the second expansion chamber 46. As depicted in FIG. 17, the fluid communication pipe 37 has an inside diameter d5 equal to or smaller than one half of an inside diameter d6 of the exhaust passage pipe 31.

Figure 13:
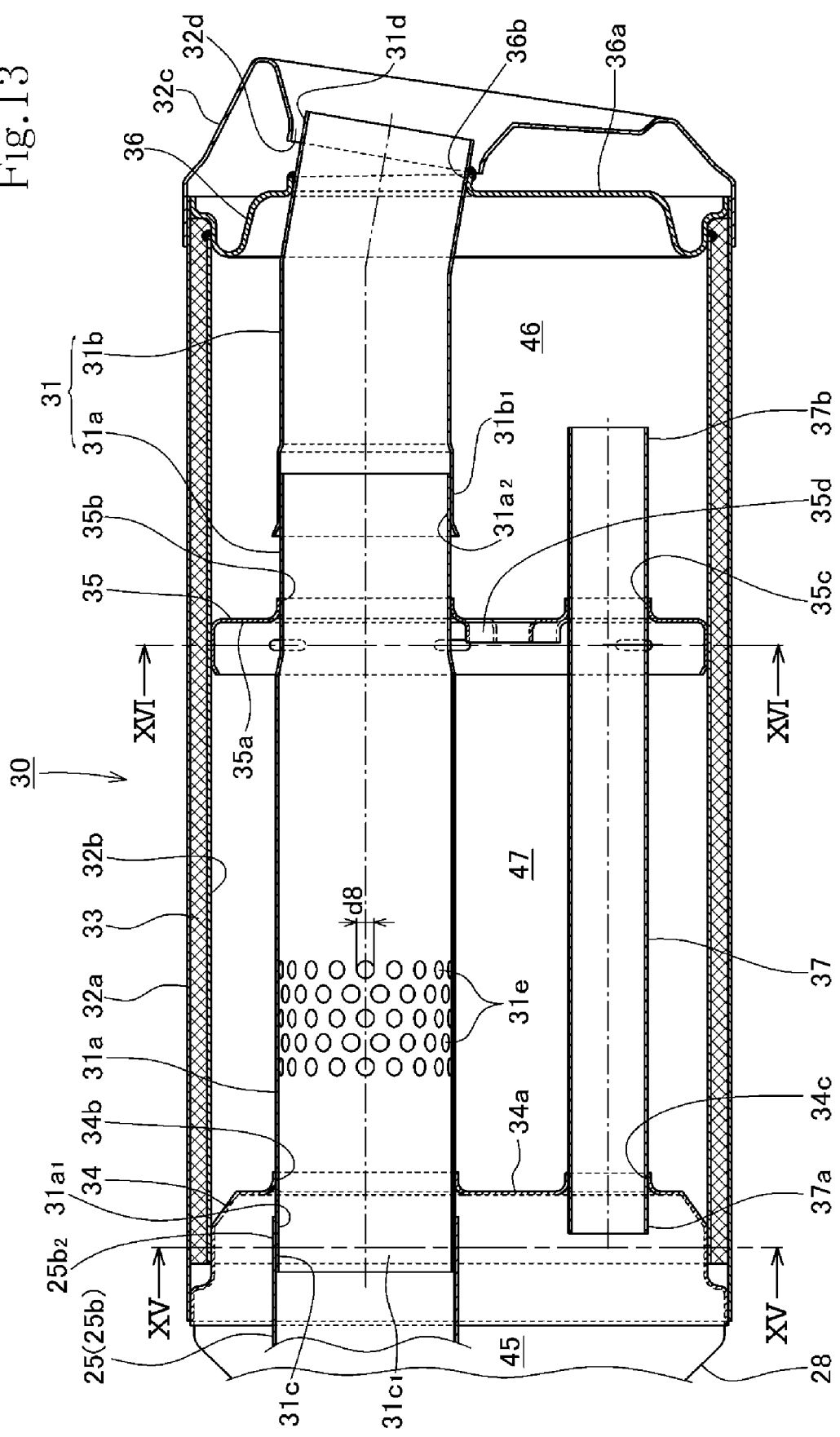
FIG. 13 is a sectional view of a second muffler section taken along line XIII-XIII of FIG. 16.
Figure 14:
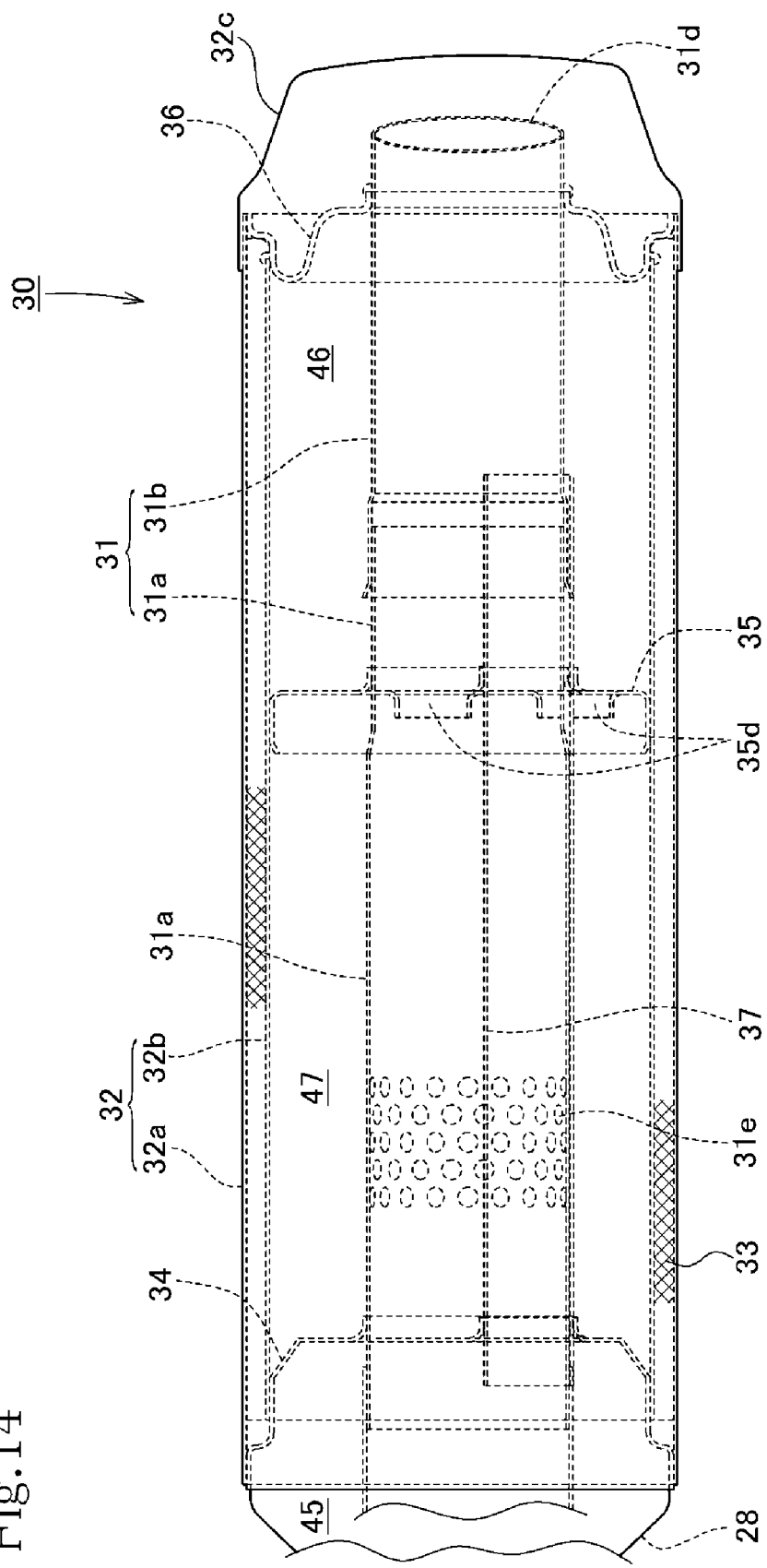
FIG. 14 is a plan view of a rear muffler section.

FIG. 13 depicts the second muffler section 30 in vertical section, and FIG. 14 depicts the second muffler section 30 in plan. The second muffler body 32 includes a tubular outer body 32a and an inner body 32b disposed in the outer body 32a with a predetermined gap therebetween. The gap between the outer body 32a and the inner body 32b is filled up with a filling material 33 such as glass wool or the like for heat insulation and sound absorption. A tail cover 32c is mounted on a downstream end of the outer body 32a and has an exhaust passage pipe insertion hole 32d defined therein. As shown sin FIGS. 15 and 16, the second muffler body 32 is of a non-circular cross-sectional shape perpendicular to the flow of exhaust gases in the second muffler body 32, which is vertically elongate, widest at a portion slightly above its center, and progressively narrower in a downward direction.

As depicted in FIGS. 5 and 13, the exhaust passage pipe 31 disposed in the second muffler body 32 is made up of a first exhaust passage pipe 31a connected to a downstream end $25b_2$ of the second divided inner pipe 25b of the first muffler section 23 and a second exhaust passage pipe 31b connected to a downstream end of the first exhaust passage pipe 31a. The second exhaust passage pipe 31b has a downstream end, i.e., the exhaust passage pipe 31 has a downstream end 31d, inserted in the exhaust passage pipe insertion hole 32d in the tail cover 32c and held in fluid communication with the ambient air.

An upstream end $31a_1$ of the first exhaust passage pipe 31a and the downstream end $25b_2$ of the second divided inner pipe 25b are of substantially the same diameter, and the downstream end $25b_2$ of the second divided inner pipe 25b is fitted over the upstream end $31a_1$ of the first exhaust passage pipe 31a. These fitted ends are not welded, but are telescopically connected to each other.

An upstream end $31b_1$ of the second exhaust passage pipe 31b and a downstream end $31a_2$ of the first exhaust passage pipe 31a are of substantially the same diameter, and the downstream end $31a_2$ of the first exhaust passage pipe 31a is fitted in the upstream end $31b_1$ of the second exhaust passage pipe 31b. These fitted ends are not welded, but are telescopically connected to each other.

Figure 15:
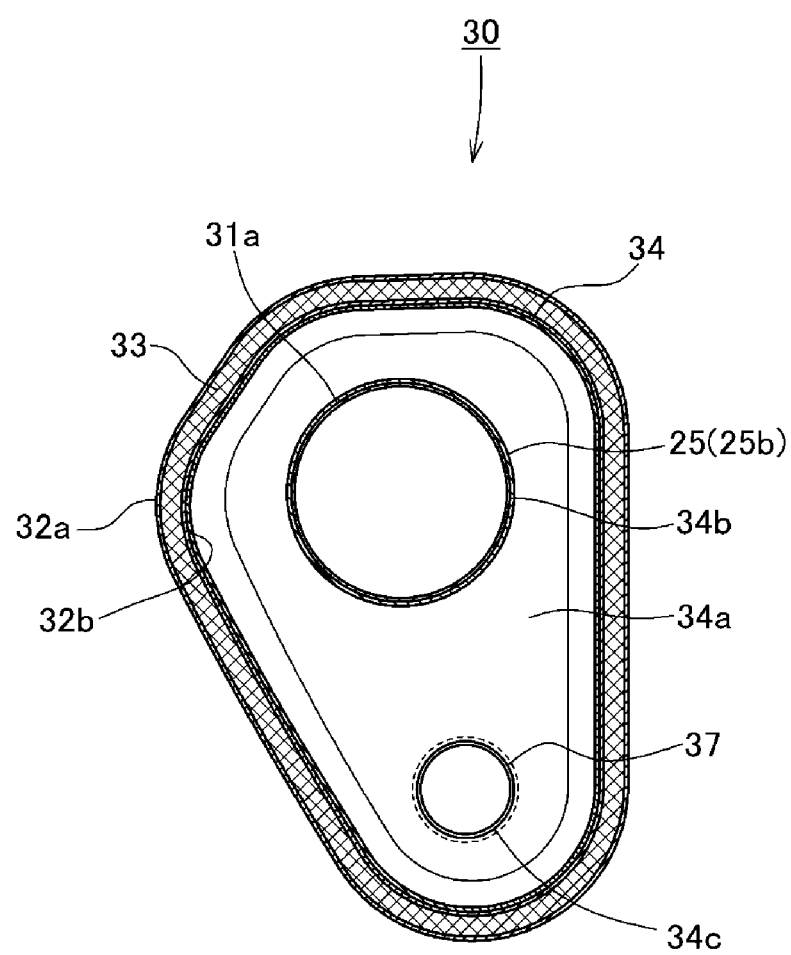
FIG. 15 is a cross-sectional view taken along line XV-XV of FIG. 13.
Figure 16:
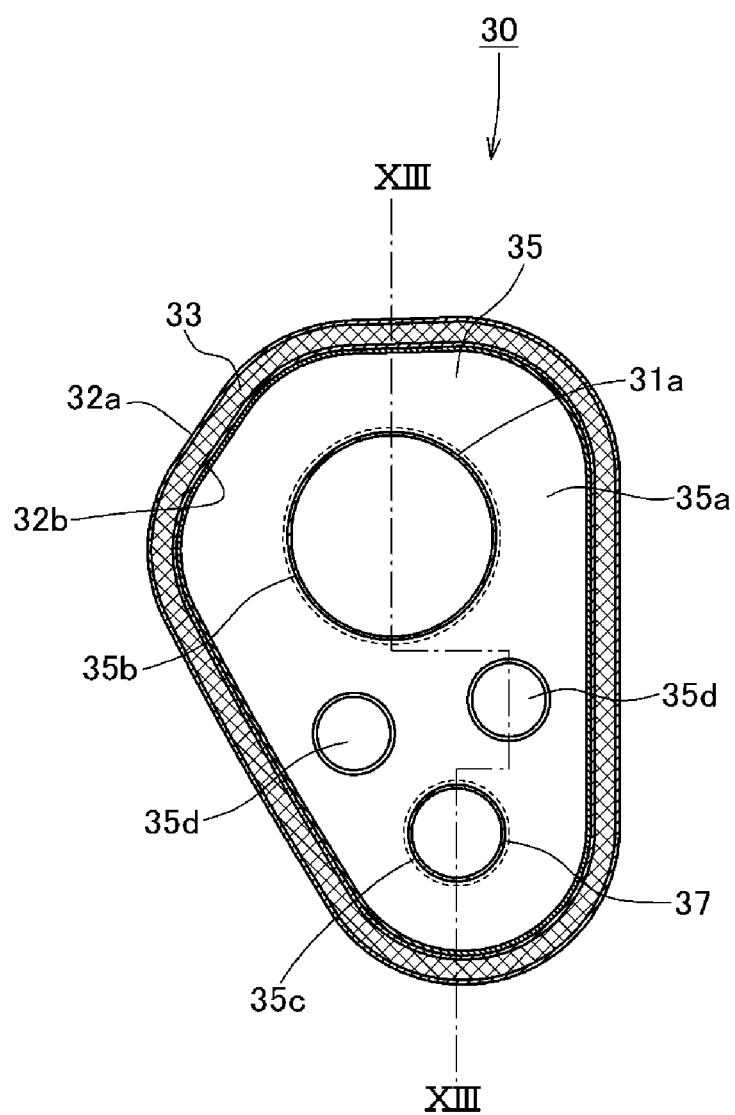
FIG. 16 is a cross-sectional view taken along line XVI-XVI of FIG. 13.

As depicted in FIGS. 5, 13, and 17, the exhaust muffler 22 has its interior divided, by the first partition wall 34 and the second partition wall 35, into the first expansion chamber 45, the third expansion chamber 47, and the second expansion chamber 46 that are arranged successively from the front. According to the present embodiment, the exhaust muffler 22 is partitioned into the three expansion chambers. However, the expansion chambers partitioned in the exhaust muffler 22 are not limited to three expansion chambers, but the exhaust muffler 22 may be partitioned into three or more expansion chambers. As depicted in FIG. 15, the first partition wall 34 has an exhaust passage pipe insertion hole 34b defined in an upper portion of a wall 34a thereof for insertion of the first exhaust passage pipe 31a therein and a fluid communication pipe insertion hole 34c defined in a lower portion of the wall 34a for insertion of the fluid communication pipe 37 therein. As depicted in FIG. 16, the second partition wall 35 has an exhaust passage pipe insertion hole 35b defined in an upper portion of a wall 35a thereof for insertion of the first exhaust passage pipe 31a therein, a fluid communication pipe insertion hole 35c defined in a lower portion of the wall 35a for insertion of the fluid communication pipe 37 therein, and a pair of left and right fluid communication holes 35d defined therein vertically between the exhaust passage pipe insertion hole 35b and the fluid communication pipe insertion hole 35c for providing fluid communication between the second expansion chamber 46 and the third expansion chamber 47. As depicted in FIG. 13, the first partition wall 34 and the second partition wall 35 are fixedly mounted in the second muffler body 32.

The exhaust passage pipe 31 is inserted in the exhaust passage pipe insertion holes 34b, 35b, and 36b in the first partition wall 34, the second partition wall 35, and the rear wall 36 and fixed to and supported by the first partition wall 34, the second partition wall 35, and the rear wall 36. The fluid communication pipe 37 is inserted in the fluid communication pipe insertion holes 34c and 35c in the first partition wall 34 and the second partition wall 35 and fixed to and supported by the first partition wall 34 and the second partition wall 35.

Figure 6:
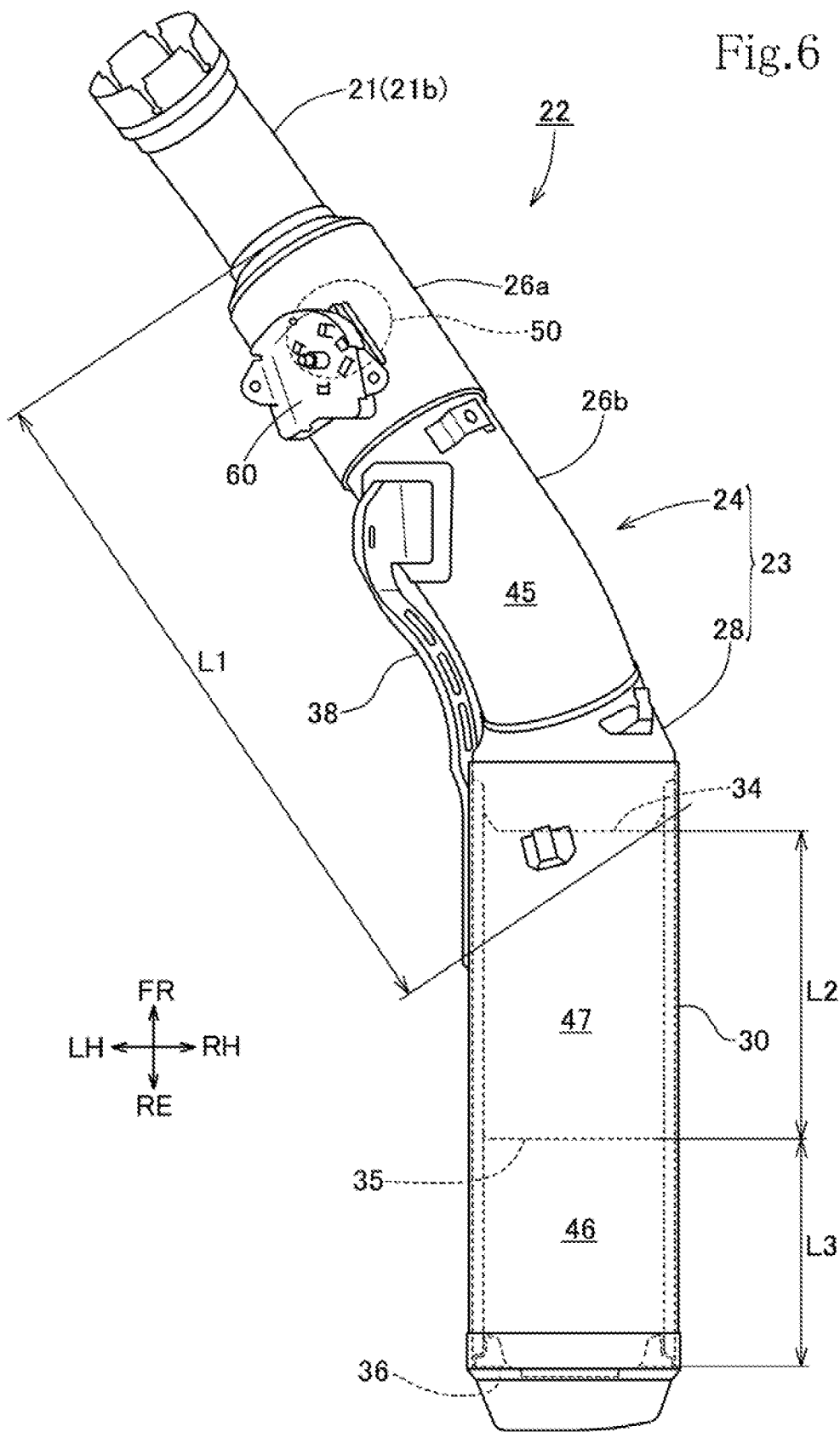
FIG. 6 is a plan view of the exhaust device.

As depicted in FIGS. 5 and 17, the first expansion chamber 45 includes a space defined between the inner pipe 25, the outer pipe 26, and the connector 28 of the first muffler section 23, and a space surrounded by the second muffler body 32 of the second muffler section 30 and an upstream surface of the first partition wall 34. The second expansion chamber 46 includes a space surrounded by the second muffler body 32, the second partition wall 35, and the rear wall 36 of the second muffler section 30. The third expansion chamber 47 includes a space surrounded by the second muffler body 32, the first partition wall 34, and the second partition wall 35 of the second muffler section 30. The second muffler section 30 has a cross-sectional area larger than a cross-sectional area of the tubular member 24 of the first muffler section 23. As depicted in FIG. 6, the first expansion chamber 45 has a length L1 larger than the sum of the length L2 of the second expansion chamber 46 and the length L3 of the third expansion chamber 47, in the direction of the flow of exhaust gases in the exhaust pipe 21, the inner pipe 25, and the exhaust passage pipe 31.

As shown in FIG. 13, the exhaust passage pipe 31 has an upstream end 31c that is open, providing a first opening $31c_1$ held in fluid communication with the inner pipe 25. The first exhaust passage pipe 31a of the exhaust passage pipe 31 has a plurality of second through holes 31e defined therein as a second opening at a position between a region where the first partition wall 34 is fixed and a region where the second partition wall 35 is fixed. The second through holes 31e provide fluid communication between the exhaust passage pipe 31 and the third expansion chamber 47. The second through holes 31e have a diameter d8 of 5 mm each, for example, and are arranged in five rows arrayed along the longitudinal directions of the exhaust passage pipe 31, each row including 19 second through holes 31e arranged in the circumferential directions of the exhaust passage pipe 31.

Since the diameters and numbers of the first through holes 21d and the second through holes 31e are set as described above, the diameter d7 of the first through holes 21d defined in the inner pipe 25 of the first muffler section 23 is larger than the diameter d8 of the second through holes 31e, and a total area A1 of the first through holes 21d is smaller than a total area A2 of the second through holes 31e.

The tubular member 24 of the first muffler section 23 is of a substantially circular cross-sectional shape, as depicted in FIGS. 5 and 9, and the second muffler section 30 is of a non-circular cross-sectional shape that is longer vertically and narrower horizontally, as depicted in FIGS. 15 and 16. As depicted in FIG. 4, the tubular member 24 of the first muffler section 23 has an outside diameter smaller than the outside diameter of the second muffler section 30 and has a constricted shape. The tubular member 24 of the first muffler section 23 and the second muffler section 30 are connected to each other by the connector 28 whose cross-sectional area is progressively larger from its front end to its rear end. The first expansion chamber 45 in the first muffler section 23 has an outside diameter smaller than the outside diameters of the second expansion chamber 46 and the third expansion chamber 47 in the second muffler section 30. As depicted in FIG. 5, the second expansion chamber 46 in the second muffler section 30 is disposed rearward and upward of the first muffler section 23, and the second expansion chamber 46 is larger in cross-sectional area than the first expansion chamber 45.

The tubular member 24 of the first muffler section 23 is disposed on a line segment L interconnecting the pivot shaft 2d and the rear wheel drive axle 6a at a point that is closer to the pivot shaft 2d than a point which is spaced from the pivot shaft 2d by a distance that is two thirds of the length of the line segment L.

The first muffler section 23 and the second muffler section 30 of the exhaust muffler 22 are sub-assembled separately and then assembled together.

Flows of exhaust gases in the exhaust device 20 according to the present embodiment will be described below with reference to FIGS. 17 and 18. FIG. 17 schematically depicts a flow of exhaust gases while the exhaust valve 50 is open. When the valve actuator 60 is operated to open the exhaust valve 50, exhaust gases emitted from the internal combustion engine E pass through the exhaust pipe 21, flow from the downstream end of the exhaust pipe 21 through the upstream end of the inner pipe 25 into the exhaust passage pipe 31, and are discharged into the ambient air from the downstream end 31d of the exhaust passage pipe 31. Though some of the exhaust gases in the exhaust pipe 21 pass through the first through holes 21d into the first compartment 45a of the first expansion chamber 45, most of the exhaust gases are discharged from the downstream end 31d of the exhaust passage pipe 31. While the exhaust valve 50 is open, therefore, the exhaust gases are discharged directly from the exhaust passage pipe 31 into the ambient air, and do not reduce the output power of the internal combustion engine E.

Figure 18:
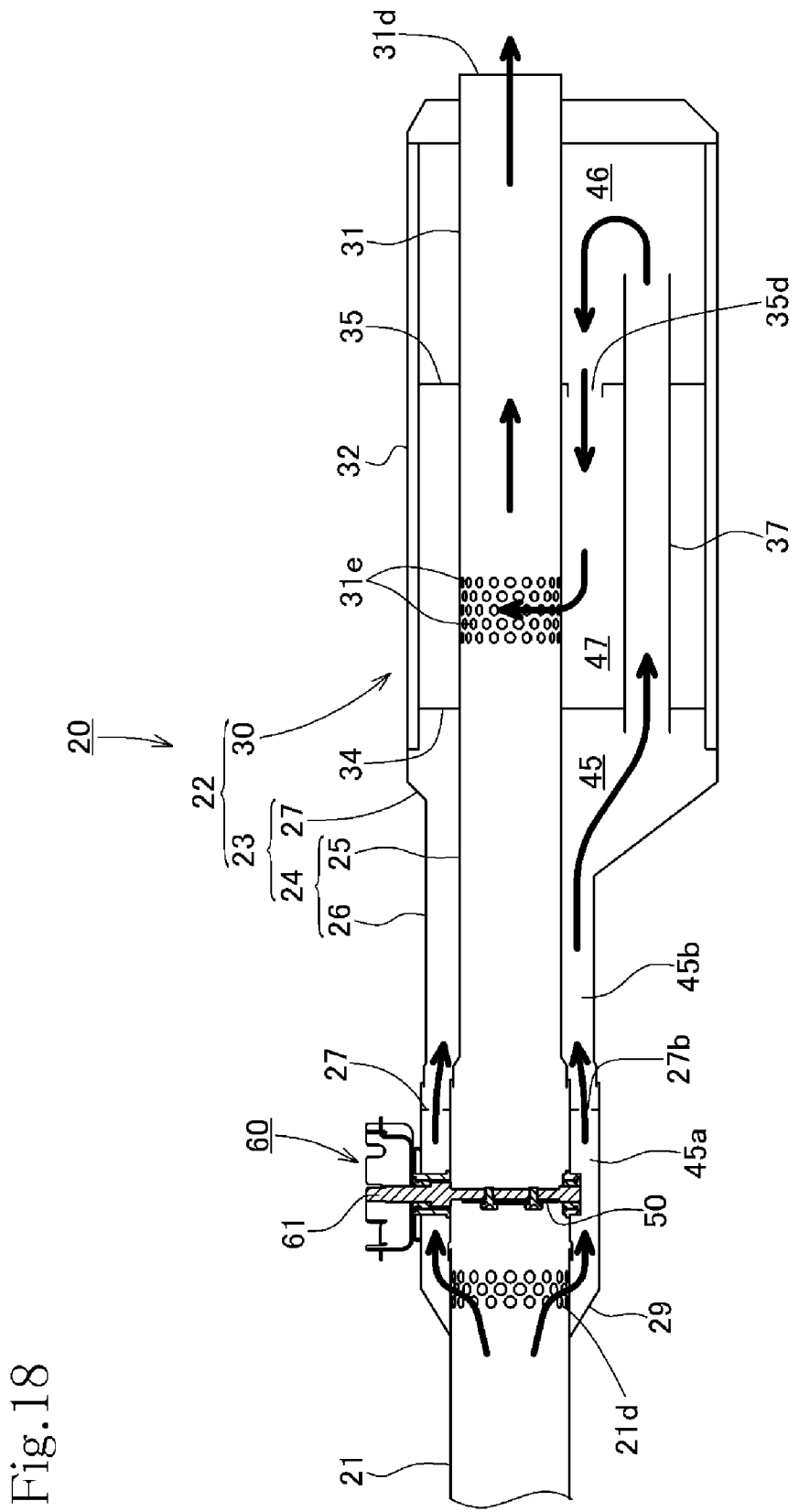
FIG. 18 is a schematic view of the exhaust muffler device, depicting a flow of exhaust gases while the exhaust valve is closed.

FIG. 18 schematically depicts a flow of exhaust gases while the exhaust valve 50 is closed. Providing the output power of the internal combustion engine E is very small, when the valve actuator 60 is operated to close the exhaust valve 50, the exhaust gases in the exhaust pipe 21 are blocked by the exhaust valve 50 in the first divided inner pipe 25a. Since the amount of exhaust gases emitted from the internal combustion engine E is small in this state, most of the exhaust gases pass through the gap between the outer circumferential edge of the exhaust valve 50 and the inner circumferential surface of the first divided inner pipe 25a. The pressure wave generated by the exhaust gases, which causes exhaust sounds, passes through the first through holes 21d in the exhaust pipe 21 upstream of the exhaust valve 50 and is transmitted into the first compartment 45a of the first expansion chamber 45.

Thereafter, the pressure wave passes from the first compartment 45a through the fluid communication holes 27b in the annular plate member 27 into the second compartment 45b, then from the second compartment 45b through the fluid communication pipe 37 that is open into the second compartment 46 into the second expansion chamber 46. Then, the pressure wave passes from the second expansion chamber 46 through the fluid communication holes 35d in the second partition wall 35 into the third expansion chamber 47. Thereafter, the pressure wave passes from the third expansion chamber 47 through the second through holes 31e in the exhaust passage pipe 31 into the exhaust passage pipe 31, and is discharged into the ambient air from the downstream end 31d of the exhaust passage pipe 31. While the exhaust valve 50 is closed, therefore, the exhaust gases emitted from the internal combustion engine E pass through the inner pipe 25 and the exhaust passage pipe 31, while the pressure wave of the exhaust gases passes through the expansion chambers 45, 46, and 47, so that the exhaust sounds are reduced.

The exhaust valve 50 is controlled so as to change the opening on the basis of the output power of the internal combustion engine E. The opening of the exhaust valve 50 is adjusted to cause the exhaust gases to flow in a manner to match the characteristics of the internal combustion engine E, thereby adjusting the flow rate of the exhaust gases. As the pressure wave is caused to pass into the expansion chambers (first expansion chamber 45) upstream of the exhaust valve 50, the noise of the exhaust gases that increases in proportion to the output power is effectively silenced. The exhaust muffler structure described above is able to separate an exhaust output route and a sound route from each other, so that the output power can be adjusted by a simple structure while a satisfactory silencing capability is achieved. Since the exhaust valve 50 is of the butterfly type, the output power of the internal combustion engine E can be set to a desired level and the silencing capability for the exhaust sounds can be set to a desired level by changing the opening of the exhaust valve 50.

Inasmuch as the exhaust device 20 for the internal combustion engine according to the embodiment of the present invention is of the above structure, it offers the following advantages.

In the exhaust device 20 according to the present embodiment, exhaust gases emitted from the internal combustion engine E and having passed through the exhaust pipe 21 are led from the first expansion chamber 45 disposed in the tubular member 24 as a multi-walled pipe through the fluid communication pipe 37 across the third expansion chamber 47 into the second expansion chamber 46, from which the exhaust gases are led through the fluid communication holes 35d defined in the second partition wall 35 into the third expansion chamber 47, and then discharged out of the exhaust muffler 22 through the exhaust passage pipe 31 that is held in fluid communication with the third expansion chamber 47. Therefore, the length of the route through which the exhaust gases flow is increased without involving an increase in the length of the exhaust device 20 in its entirety, resulting in an increased silencing capability. Furthermore, since the exhaust gases are discharged into the second expansion chamber 46 after having passed through the long slender fluid communication pipe 37, the energy of the exhaust gases is reduced efficiently.

Moreover, the inner pipe 25 is connected to the downstream end 21e of the exhaust pipe 21, the exhaust passage pipe 31 is connected to the downstream end $25b_2$ of the inner pipe 25, the exhaust pipe 21 has the first through holes 21d held in fluid communication with the first expansion chamber 45, and the inner pipe 25 houses therein the exhaust valve 50 for changing an amount of exhaust gases flowing from the exhaust pipe 21 through the first through holes 21d into the first expansion chamber 45. Therefore, exhaust gases are led from an upstream side of the tubular member 24 as a multi-walled pipe into the first expansion chamber 45, so that the volume of the first expansion chamber 45 can effectively be used. In addition, the proportion of exhaust gases discharged after having passed from the exhaust pipe 21 through the inner pipe 25 and the exhaust passage pipe 31 and the proportion of exhaust gases discharged after having passed through the first expansion chamber 45, the second expansion chamber 46, and the third expansion chamber 47 can be changed by the exhaust valve 50 to control the output power of the engine. As exhaust gases flowing from the exhaust pipe 21 into the exhaust muffler 22 flow through the first through holes 21d into the first expansion chamber 45, the flow of exhaust gases is constricted for an increased silencing capability.

Moreover, the exhaust passage pipe 31 and the third expansion chamber 47 are held in fluid communication with each other through the second through holes 31e defined in the exhaust passage pipe 31, and the diameter d7 of the first through holes 21d is larger than the diameter d8 of the second through holes 31e, so that exhaust gases are well discharged from an upstream side of the exhaust muffler 22.

Furthermore, as the total area of the second through holes 31e is larger than the total area of the first through holes 21d, exhaust gases in the exhaust muffler 22 are easily discharged through the second through holes 31e.

In addition, the inside diameter d3 of the outer pipe 26 is in the range of 1.5 to 2.0 times the inside diameter d4 of the inner pipe 25. Consequently, while the volume of the first expansion chamber 45 defined between the inner pipe 25 and the outer pipe 26 is sufficiently maintained, the diameter of the tubular member 24 connected to the exhaust pipe 21 is not much larger than the diameter of the exhaust pipe 21, but the tubular member 24 is of a shape blending into the exhaust pipe 21. The tubular member 24 is thus placed in the conventional layout of the exhaust pipe, and hence can be designed for a better layout configuration.

Furthermore, as the inside diameter d5 of the fluid communication pipe 37 is equal to or smaller than one half of the inside diameter d6 of the exhaust passage pipe 31, exhaust gases are sufficiently discharged from the larger-diameter exhaust passage pipe 31, and exhaust gases from the first expansion chamber 45 are discharged through the slender and long fluid communication pipe 37 into the second expansion chamber 46, the energy of exhaust gases is reduced further efficiently for a better silencing capability.

Moreover, the length L1 of the first expansion chamber 45 is larger than the sum of the length L2 of the second expansion chamber 46 and the length L3 of the third expansion chamber 47 in the direction of the flow of exhaust gases in the exhaust pipe 21, the inner pipe 25, and the exhaust passage pipe 31. Therefore, as the length of the first expansion chamber 45 defined in the tubular member 24 which is of a smaller cross-sectional area is larger than the sum of the lengths L2 and L3 of the second expansion chamber 46 and the third expansion chamber 47 that are defined in the second muffler section 30 which is of a larger cross-sectional area, the first expansion chamber 45 has a sufficient volume and the exhaust device 20 has a neat appearance.

The first through holes 21d are positioned on an upstream end side of the first muffler section 23, upstream of the position at one half of the distance between the upstream end of the first muffler section 23 and the exhaust valve shaft 51 of the exhaust valve 50 in the direction of the flow of exhaust gases in the first muffler section 23. Therefore, exhaust gases are discharged into an upstream side of the first expansion chamber 45, whereby the first expansion chamber 45 can be used effectively.

Figure 19:
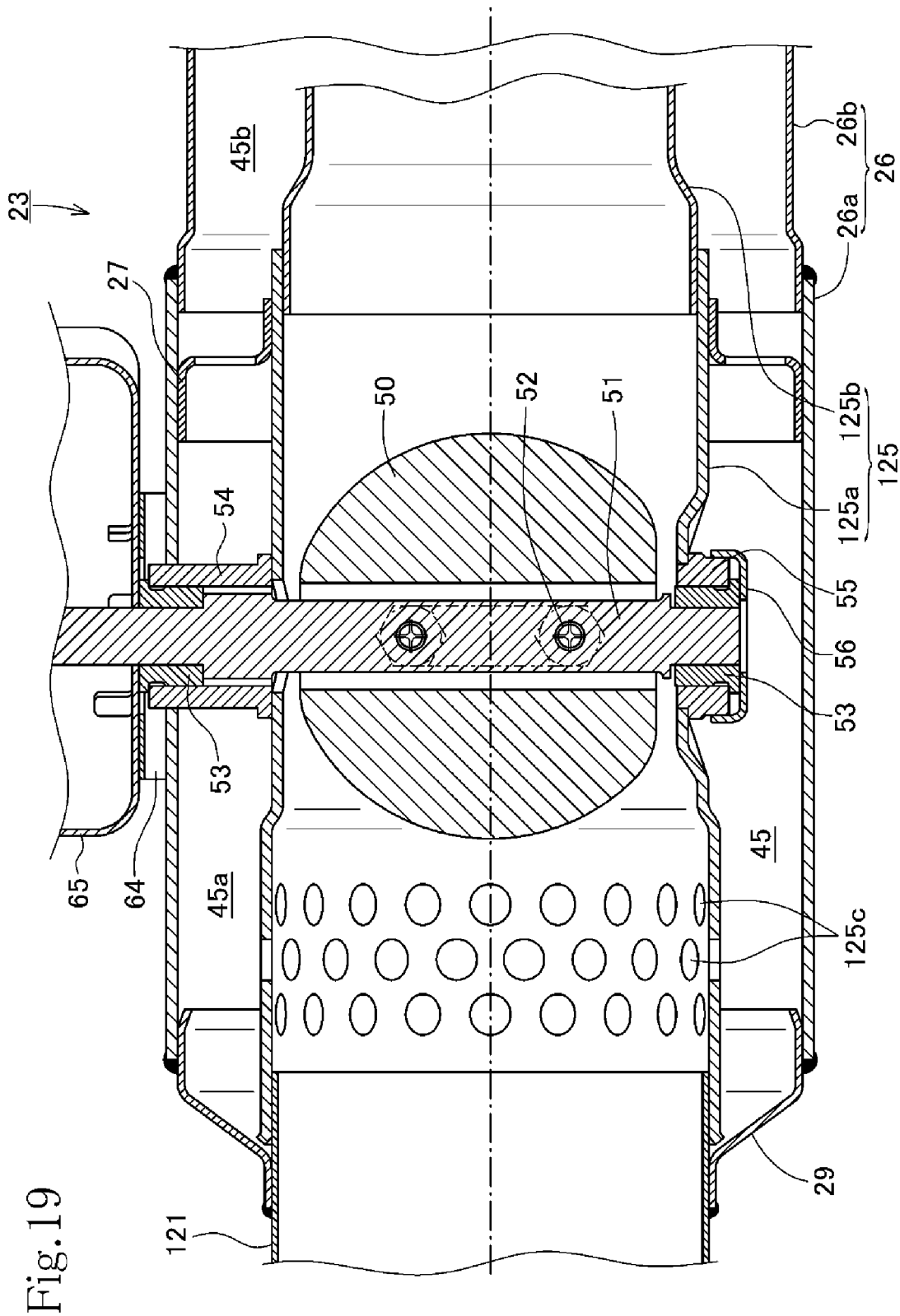
FIG. 19 is a fragmentary horizontal sectional view of a first muffler section of an exhaust device for an internal combustion engine according to a second embodiment of the present invention.

A second embodiment will next be described below. According to the first embodiment described above, the first through holes 21d are formed in the exhaust pipe 21 as holes through which exhaust gases in the exhaust pipe 21 and the first divided inner pipe 25a flow into the first expansion chamber 45 upstream of the exhaust valve 50. According to the second embodiment, however, as depicted in FIG. 19, an exhaust device 20 uses an exhaust pipe 121 free of through holes and an inner pipe 125 made up of a first divided inner pipe 125a with first through holes 125c therein and a second divided inner pipe 125b, and the first through holes 125c in the first divided inner pipe 125a is used as holes through which exhaust gases in the exhaust pipe 121 and the first divided inner pipe 125a flow into the first expansion chamber 45 upstream of the exhaust valve 50. Other structural details of the second embodiment are similar to those of the first embodiment.

According to the second embodiment, the inner pipe 125 is connected to a downstream end 121e of the exhaust pipe 121, the exhaust passage pipe 31 is connected to a downstream end $125b_2$ of the inner pipe 125, the inner pipe 125 has the first through holes 125c held in fluid communication with the first expansion chamber 45, and the inner pipe 125 houses the exhaust valve 50 for changing the amount of exhaust gases flowing from the exhaust pipe 121 through the first through holes 125c into the first expansion chamber 45. Consequently, the exhaust gases are led from an upstream side of the tubular member 24 as a multi-walled pipe into the first expansion chamber 45, so that the volume of the first expansion chamber 45 can effectively be used. In addition, the proportion of exhaust gases discharged after having passed from the exhaust pipe 121 through the inner pipe 125 and the exhaust passage pipe 31 and the proportion of exhaust gases discharged after having passed through the first expansion chamber 45, the second expansion chamber 46, and the third expansion chamber 47 can be changed by the exhaust valve 50 to control the output power of the engine. As exhaust gases flowing from the inner pipe 125 into the exhaust muffler 22 flow through the first through holes 125c into the first expansion chamber 45, the flow of exhaust gases is constricted for an increased silencing capability.

Although the embodiments of the present invention have been described in detail above, the present invention is not limited to the above embodiments, but various other changes and modifications may be made therein. The exhaust device 20 according to the present invention is not limited to use on the motorcycle 1, but is also widely applicable to other types of saddle-type vehicles.

REFERENCE SIGNS LIST

E . . . Internal combustion engine, d3 . . . Inside diameter, d4 . . . Inside diameter, d5 . . . Inside diameter, d6 . . . Inside diameter, d7 . . . Diameter, d8 . . . Diameter, L1 . . . Length of first expansion chamber, L2 . . . Length of second expansion chamber, L3 . . . Length of third expansion chamber, 1 . . . Two-wheel motorcycle, 2 . . . Vehicle body frame, 2d . . . Pivot shaft, 6 . . . Swing arm, 6a . . . Rear wheel drive axle, 20 . . . Exhaust device, 21 . . . Exhaust pipe, 21d . . . First through hole, 21e . . . Downstream end, 22 . . . Exhaust muffler, 22a . . . Front end, 23 . . . First muffler section, 23a . . . Curved portion, 24 . . . Tubular member, 25 . . . Inner pipe, 25a . . . First divided inner pipe, 25b . . . Second divided inner pipe, $25b_2$ . . . Downstream end, 26 . . . Outer pipe, 27 . . . Annular plate member, 27b . . . Fluid communication hole, 28 . . . Connector, 30 . . . Second muffler section, 32 . . . Second muffler body, $31c_1$ . . . First opening, 31e . . . Second through hole, 34 . . . First partition wall, 35 . . . Second partition wall, 36 . . . Rear wall, 40 . . . Exhaust passage pipe, 40a . . . Upstream end, 41 . . . Front exhaust passage pipe, 41a . . . First exhaust passage pipe, 41b . . . Second exhaust passage pipe, 42 . . . Rear exhaust passage pipe, 42a . . . Third exhaust passage pipe, 42b . . . Fourth exhaust passage pipe, 45 . . . First expansion chamber, 46 . . . Second expansion chamber, 47 . . . Third expansion chamber, 50 . . . Exhaust valve,
60 . . . Valve actuator,
121 . . . Exhaust pipe, 121d . . . First through hole, 121e . . . Downstream end, 125 . . . Inner pipe, 125d . . . First through hole

The invention claimed is:

1. An exhaust device for an internal combustion engine, for discharging exhaust gases from an internal combustion engine supported on a vehicle body frame of a saddle-type vehicle, said exhaust device comprising:

an exhaust pipe connected to said internal combustion engine; and
an exhaust muffler connected to a downstream side of said exhaust pipe,
wherein said exhaust muffler includes a first muffler section connected to said exhaust pipe and a second muffler section connected to a downstream side of said first muffler section, to cause exhaust gases delivered from said exhaust pipe to pass through said first muffler section and to be discharged from said second muffler section out of said exhaust muffler,
wherein said first muffler section includes a tubular member made up of an inner pipe and an outer pipe covering said inner pipe, and a connector connecting said outer pipe of said tubular member and an outer shell of said second muffler section to each other,
wherein said second muffler section includes an outer shell, a first partition wall partitioning a front portion of an inner space in said outer shell, a second partition wall partitioning a space behind said first partition wall, and a third partition wall partitioning a space behind said second partition wall,
wherein said second muffler section has a cross-sectional area larger than a cross-sectional area of said tubular member of said first muffler section,
wherein said exhaust muffler includes:
a first expansion chamber for receiving incoming exhaust gases from said exhaust pipe, said first expansion chamber being surrounded by said outer pipe, said connector, and said inner pipe of said first muffler section, and said outer shell and said first partition wall of said second muffler section;
a second expansion chamber surrounded by said outer shell, said second partition wall, and said third partition wall of said second muffler section; and
a third expansion chamber surrounded by said outer shell, said first partition wall, and said second partition wall of said second muffler section, wherein said second muffler section includes:
a fluid communication pipe extending through said first partition wall and said second partition wall for leading exhaust gases from said first expansion chamber into said second expansion chamber; and
an exhaust passage pipe held in fluid communication with said third expansion chamber and extending through said second partition wall and said third partition wall,
wherein said second partition wall has a fluid communication hole defined therein that provides fluid communication between said second expansion chamber and said third expansion chamber,
wherein said first expansion chamber has a length larger than the sum of a length of said second expansion chamber and a length of said third expansion chamber in the direction of a flow of exhaust gases in said exhaust pipe, said inner pipe, and said exhaust passage pipe, and
wherein:
said inner pipe is connected to a downstream end of said exhaust pipe;
said exhaust passage pipe extends through said first partition wall and is connected to a downstream end of said inner pipe;
said first expansion chamber is defined between said inner pipe and said outer pipe of said first muffler section;
said exhaust pipe has a plurality of first through holes defined therein that is held in fluid communication with said first expansion chamber; and
said inner pipe houses therein a valve for changing an amount of exhaust gases flowing from said exhaust pipe through said first through holes into said first expansion chamber, said valve being disposed downstream of said first through holes.

2. The exhaust device for an internal combustion engine according to claim 1, wherein:
said exhaust passage pipe and said third expansion chamber are held in fluid communication with each other by a plurality of second through holes defined in said exhaust passage pipe; and
said first through holes have a diameter larger than a diameter of said second through holes.

3. The exhaust device for an internal combustion engine according to claim 2, wherein said second through holes have a total cross-sectional area larger than a total cross-sectional area of said first through holes.

4. The exhaust device for an internal combustion engine according to claim 1, wherein said first through holes are positioned on an upstream end side of said first muffler section, upstream of a position at one half of the distance between an upstream end of said first muffler section and a valve shaft of said valve in the direction of flow of exhaust gases in said first muffler section.

5. The exhaust device for an internal combustion engine according to claim 1, wherein said outer tube has an inside diameter ranging from 1.5 to 2.0 times an inside diameter of said inner pipe.

6. The exhaust device for an internal combustion engine according to claim 2, wherein said outer tube has an inside diameter ranging from 1.5 to 2.0 times an inside diameter of said inner pipe.

7. The exhaust device for an internal combustion engine according to claim 1, wherein said fluid communication pipe has an inside diameter equal to or smaller than one half of an inside diameter of said exhaust passage pipe.

8. The exhaust device for an internal combustion engine according to claim 2, wherein said fluid communication pipe has an inside diameter equal to or smaller than one half of an inside diameter of said exhaust passage pipe.

9. The exhaust device for an internal combustion engine according to claim 3, wherein said fluid communication pipe has an inside diameter equal to or smaller than one half of an inside diameter of said exhaust passage pipe.

10. An exhaust device for an internal combustion engine, for discharging exhaust gases from an internal combustion engine supported on a vehicle body frame of a saddle-type vehicle, said exhaust device comprising:
an exhaust pipe connected to said internal combustion engine; and
an exhaust muffler connected to a downstream side of said exhaust pipe,
wherein said exhaust muffler includes a first muffler section connected to said exhaust pipe and a second muffler section connected to a downstream side of said first muffler section, to cause exhaust gases delivered from said exhaust pipe to pass through said first muffler section and to be discharged from said second muffler section out of said exhaust muffler,
wherein said first muffler section includes a tubular member made up of an inner pipe and an outer pipe covering said inner pipe, and a connector connecting said outer pipe of said tubular member and an outer shell of said second muffler section to each other,
wherein said second muffler section includes an outer shell, a first partition wall partitioning a front portion of an inner space in said outer shell, a second partition wall partitioning a space behind said first partition wall, and a third partition wall partitioning a space behind said second partition wall,
wherein said second muffler section has a cross-sectional area larger than a cross-sectional area of said tubular member of said first muffler section,
wherein said exhaust muffler includes:
a first expansion chamber for receiving incoming exhaust gases from said exhaust pipe, said first expansion chamber being surrounded by said outer pipe, said connector, and said inner pipe of said first muffler section, and said outer shell and said first partition wall of said second muffler section;
a second expansion chamber surrounded by said outer shell, said second partition wall, and said third partition wall of said second muffler section; and
a third expansion chamber surrounded by said outer shell, said first partition wall, and said second partition wall of said second muffler section, wherein said second muffler section includes:
a fluid communication pipe extending through said first partition wall and said second partition wall for leading exhaust gases from said first expansion chamber into said second expansion chamber; and
an exhaust passage pipe held in fluid communication with said third expansion chamber and extending through said second partition wall and said third partition wall,
wherein said second partition wall has a fluid communication hole defined therein that provides fluid communication between said second expansion chamber and said third expansion chamber,
wherein said first expansion chamber has a length larger than the sum of a length of said second expansion chamber and a length of said third expansion chamber in the direction of a flow of exhaust gases in said exhaust pipe, said inner pipe, and said exhaust passage pipe, and
wherein:
said inner pipe is connected to a downstream end of said exhaust pipe;
said exhaust passage pipe extends through said first partition wall and is connected to a downstream end of said inner pipe;
said first expansion chamber is defined between said inner pipe and said outer pipe of said first muffler section;
said inner pipe has a plurality of first through holes defined therein; and
said inner pipe houses therein a valve for changing an amount of exhaust gases discharged through said first through holes into said first expansion chamber, said valve being disposed downstream of said first through holes.

11. The exhaust device for an internal combustion engine according to claim 10, wherein:
said exhaust passage pipe and said third expansion chamber are held in fluid communication with each other by a plurality of second through holes defined in said exhaust passage pipe; and
said first through holes have a diameter larger than a diameter of said second through holes.

12. The exhaust device for an internal combustion engine according to claim 10, wherein said outer tube has an inside diameter ranging from 1.5 to 2.0 times an inside diameter of said inner pipe.

13. The exhaust device for an internal combustion engine according to claim 10, wherein said fluid communication pipe has an inside diameter equal to or smaller than one half of an inside diameter of said exhaust passage pipe.

14. The exhaust device for an internal combustion engine according to claim 10, wherein said first through holes are positioned on an upstream end side of said first muffler section, upstream of a position at one half of the distance between an upstream end of said first muffler section and a valve shaft of said valve in the direction of flow of exhaust gases in said first muffler section.

* * * * *